United States Patent
Novoselsky et al.

(10) Patent No.: US 11,822,007 B2
(45) Date of Patent: Nov. 21, 2023

(54) SYSTEM AND METHOD FOR IDENTIFICATION OF AN AIRBORNE OBJECT

(71) Applicant: Elta Systems Ltd., Ashdod (IL)

(72) Inventors: Akiva Novoselsky, Modi'in (IL); Eran Notkin, Nahalal (IL); Nimrod Teneh, Herzliya (IL); Gregory Lukovsky, Givat-Shmuel (IL); Guy Ardon, Ra'anana (IL); Or Simko, Ness Ziona (IL)

(73) Assignee: Elta Systems Ltd., Ashdod (IL)

( * ) Notice: Subject to any disclaimer, the term of this patent is extended or adjusted under 35 U.S.C. 154(b) by 409 days.

(21) Appl. No.: 16/790,173

(22) Filed: Feb. 13, 2020

(65) Prior Publication Data

US 2020/0271756 A1    Aug. 27, 2020

(30) Foreign Application Priority Data

Feb. 14, 2019 (IL) .......................... 264843
Jul. 31, 2019 (IL) .......................... 268398

(51) Int. Cl.
*G01S 7/41* (2006.01)
*G01S 13/72* (2006.01)

(52) U.S. Cl.
CPC .............. *G01S 7/412* (2013.01); *G01S 7/415* (2013.01); *G01S 7/417* (2013.01); *G01S 13/723* (2013.01)

(58) Field of Classification Search
CPC .......... G01S 7/412; G01S 7/415; G01S 7/417; G01S 13/723; G01S 7/41; G01S 7/411; G01S 7/414; G01S 7/418

(Continued)

(56) References Cited

U.S. PATENT DOCUMENTS

| 5,392,050 A | * | 2/1995 | Guerci | .................... G01S 7/412 342/90 |
| 5,821,896 A | * | 10/1998 | Nakano | .................... G01S 7/412 342/146 |
| 6,337,654 B1 | * | 1/2002 | Richardson | ......... G01S 13/9027 342/25 A |

(Continued)

FOREIGN PATENT DOCUMENTS

| CN | 109100690 A | * | 12/2018 |
| JP | 2001324567 A | | 11/2001 |

(Continued)

OTHER PUBLICATIONS

"Andrew French, Target recognition techniques for multifunction phased array radar, Jan. 2010, Department of Electronic and Electrical Engineering, University College London" (Year: 2010).*

(Continued)

*Primary Examiner* — Timothy A Brainard
*Assistant Examiner* — Michael W Justice
(74) *Attorney, Agent, or Firm* — Dorsey & Whitney LLP

(57) ABSTRACT

There is provided a processor-based method of identifying an airborne object, the method comprising: obtaining a series of target Radar Cross Section (RCS) measurements of an airborne object, with associated aspect angles of the airborne object relative to a measuring radar; calculating at least one estimation of a candidate aircraft RCS time series in accordance with the series of target aspect angles, a candidate aircraft type, and at least one candidate aircraft body orientation; and determining an identification of the airborne object with an aircraft type, in accordance with the estimations of a candidate aircraft RCS time series, and the series of target RCS measurements.

20 Claims, 11 Drawing Sheets

(58) Field of Classification Search
USPC .............................................. 342/195, 13, 14
See application file for complete search history.

(56) References Cited

U.S. PATENT DOCUMENTS

| | | | | |
|---|---|---|---|---|
| 6,437,728 | B1* | 8/2002 | Richardson | G01S 13/9027 342/25 A |
| 6,580,388 | B1* | 6/2003 | Stoyanov | G01S 7/411 342/195 |
| 7,002,509 | B2 | 2/2006 | Karlsson | H04W 99/00 342/13 |
| 7,295,149 | B1* | 11/2007 | Wolf | F41H 11/02 342/90 |
| 8,625,905 | B2* | 1/2014 | Schmidt | G01S 7/003 382/103 |
| 9,019,143 | B2* | 4/2015 | Obermeyer | H01Q 1/28 343/705 |
| 10,338,213 | B1* | 7/2019 | Faulhaber | F41H 3/00 |
| 10,620,304 | B2* | 4/2020 | Halbert | G01S 7/003 |
| 2002/0057216 | A1* | 5/2002 | Richardson | G01S 7/412 342/25 A |
| 2009/0102705 | A1* | 4/2009 | Obermeyer | G01S 13/9029 343/705 |
| 2012/0195459 | A1* | 8/2012 | Schmidt | G06V 40/20 382/103 |

FOREIGN PATENT DOCUMENTS

| | | |
|---|---|---|
| JP | 2002277542 A | 9/2002 |
| JP | 2012103188 A | 5/2012 |

OTHER PUBLICATIONS

Baoshuai et al., "Classification Scheme for Airplane Targets Based on Empirical Mode Decomposition", IET International Radar Conference, 2013, 3.

Battiti et al., "BFGS Optimization for Faster and Automated Supervised Learning", International Neural Network Conference, 1990, pp. 757-758.

Chakrabarti et al., "A Fuzzy Neural-Network-Model for Aspect-Independent Target Identification", IEEE Antennas and Propagation Society International Symposium and URSI National Radio Science Meeting, vol. 1, 1994, pp. 566-569.

Colominas et al., "Improved Complete Ensemble EMD: A Suitable Tool for Biomedical Signal Processing", Biomedical Signal Processing and Control, vol. 14, 2014, pp. 19-29.

Herman et al., "A Particle Filtering Approach to FM-Band Passive Radar Tracking and Automatic Target Recognition", Proceedings, IEEE Aerospace Conference, vol. 4, 2002, pp. 1789-1808.

Hjorth, "EEG Analysis Based on Time Domain Properties", Electroencephalography and Clinical Neurophysiology, vol. 29, Issue 3, 1970, pp. 306-310.

Huang et al., "The Empirical Mode Decomposition and the Hilbert Spectrum for Nonlinear and Non-Stationary Time Series Analysis", Proceedings of the Royal Society of London: Series A, vol. 454, 1971, pp. 903-995.

Khvostenko et al., "Tokamak T-15MD—Two Years Beofre the Physical Start-Up", Fusion Engineering and Design 146, 2019, 1108-1112.

Molchanov et al., "Aerial Target Classification by Micro-Doppler Signatures and Biocoherence-Based Features", Proceedings of the 9th European Radar Conference, 2012, pp. 1-23.

Moller, "A Scaled Conjugate Gradient Algorithm for Fast Supervised Learning", Neural Newtworks, vol. 6, No. 4, 1993, pp. 525-533.

Moller F. M., "Learning By Conjugate Gradients", Computer Science Department, Mathematical Institute, vol. 464, 1990, pp. 184-194.

Notkin et al., "Classification of Ground Moving Radar Targets with RBF Neural Networks", 8th Internationals Conference on Pattern Recognition Applications and Methods, 2019, 6.

Rilling et al., "On Empirical Mode Decomposition and its Algorithms", IEEE-Eurasip Workshop on Nonlinear Signal and Image Processing, vol. 3, No. 3, 2003, pp. 8-11.

Serrá, "A Competitive Measure to Assess the Similiarity Between Two Time Series", Case-Based Reasoning Research and Development: International Conference on Case-Based Reasoning, Lecture Notes in Computer Science, vol. 7466, 2012, pp. 414-427.

Skolnik et al., "Effect of Tourniquet Shock and Acute Hemorrhage on the Circulation of Various Organs in the Rat", Circulation Research, vol. 10. No. 5, 1962, pp. 753-757.

Skolnik, "Introduction to Radar Systems", New York: McGraw Hill, Inc., 1962, 10.

Theodoridis et al., "Pattern Recognition", 2nd Edition, 2003, 19.

Ting et al., "Radar Target Recognition Algorithm Based on RCS Observation Sequence—Set-Valued Identification Method", International Journal of Signal Processing, Image Processing and Pattern Recognition, vol. 8, No. 11, 2015, pp. 283-298.

Xie et al., "Feature Extraction of Space Targets Via Variational Mode Decomposition", IEEE International Conference on Information and Automation, 2018, pp. 1530-1534.

* cited by examiner

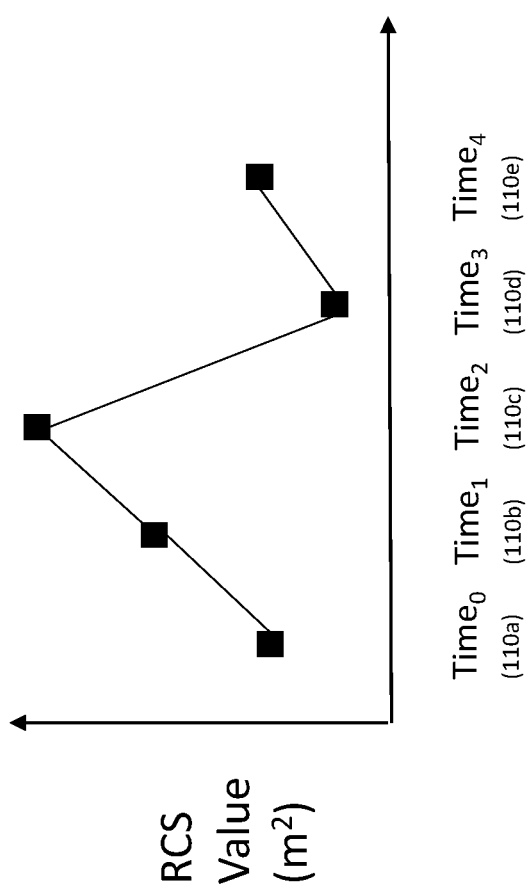

| Radar Beam direction (in aircraft body frame) | | RCS value for Aircraft "abc-123" |
|---|---|---|
| Azimuth 45 deg. | Elevation 45 deg. | $RCS_0$ |
| Azimuth 45 deg. | Elevation 44.5 deg. | $RCS_1$ |
| ... | ... | ... |
| Azimuth 44.5 deg. | Elevation 45 deg. | ... |
| ... | ... | ... |

310

| Radar Beam direction (in aircraft body frame) | | RCS value for Aircraft "abc-567" |
|---|---|---|
| ... | ... | ... |

320

| Radar Beam direction (in aircraft body frame) | | RCS value for Aircraft "ZZ" |
|---|---|---|
| ... | ... | ... |

SYSTEM AND METHOD FOR IDENTIFICATION OF AN AIRBORNE OBJECT

TECHNICAL FIELD

The presently disclosed subject matter relates to radar systems and, more particularly, to radar systems for tracking airborne objects such as aircraft.

BACKGROUND

Radar can accurately measure two physical quantities for each target: range and radial velocity (Doppler effect). In addition, radar provides a reasonable estimation of the position of the target relative to the sensor (i.e. azimuth and elevation). None of these quantities enable direct inference regarding the specific type of target being tracked.

GENERAL DESCRIPTION

According to one aspect of the presently disclosed subject matter there is provided a method for identifying an airborne object, comprising:
  a) obtaining, by a processor, data indicative of a series of measurements, by a radar, of a radar cross section (RCS) of an airborne object, each RCS measurement being associated with data indicative of aspect angles of the airborne object relative to the radar; and
  b) calculating, by the processor, a degree of matching between the series of RCS measurements and an estimated RCS time series for a first candidate aircraft type,
    the estimated RCS time series being calculated according to, at least,
    i) the data indicative of the aspect angles of at least one RCS measurement of the series of RCS measurements; and
    ii) at least one candidate airborne object body orientation;
  thereby giving rise to a degree of RCS matching indicative of whether the airborne object is identified with the first candidate aircraft type and the least one candidate airborne object body orientation.

In addition to the above features, the method according to this aspect of the presently disclosed subject matter can comprise one or more of features (i) to (xvii) listed below, in any desired combination or permutation which is technically possible:
  i) c) repeating b) for one or more additional at least one candidate airborne object body orientations;
    thereby giving rise to one or more additional degrees of RCS matching indicative of whether the airborne object is identified with the first candidate aircraft type and a respective at least one candidate airborne object body orientation.
  ii) repeating b)-c) for at least one additional candidate aircraft type;
    thereby giving rise to at least one additional degree of RCS matching indicative of whether the airborne object is identified with a respective candidate aircraft type and a respective at least one candidate airborne object body orientation.
  iii) further comprising:
    identifying, by the processor, the candidate aircraft type for which was estimated the RCS time series that gave rise to the best calculated degree of RCS matching,
    thereby giving rise to a best match aircraft type.
  iv) further comprising:
    comparing, by the processor, the best calculated degree of RCS matching to a threshold degree of RCS matching;
    thereby giving rise to an indication of whether the airborne object is identified with the best match aircraft type.
  v) further comprising:
    comparing, by the processor, the best calculated degree of RCS matching to a second best calculated degree of RCS matching, thereby giving rise to a degree of difference of RCS matching;
    comparing, by the processor, the degree of difference of RCS matching to a threshold degree of difference;
    thereby giving rise to an indication of whether the airborne object is identified with the best match aircraft type.
  vi) further comprising:
    displaying, on a display unit, data informative of the best match aircraft type.
  vii) wherein the estimation of an RCS time series for a candidate aircraft type comprises:
    a) calculating an RCS estimation according to, at least:
      i) aspect angles associated with an RCS measurement of the series of RCS measurements, and
      ii) a candidate airborne object body orientation;
    thereby giving rise to an RCS estimation for the candidate aircraft type at the aspect angles associated with the RCS measurement.
  viii) further comprising:
    repeating a) for one or more additional RCS measurements.
  ix) wherein:
    a flight mode is inferred for the respective RCS measurement, and
    the candidate airborne object body orientation is estimated according to the inferred flight mode.
  x) wherein the inferred flight mode is selected from a group that includes at least one of: level flight, ascending flight, descending flight, banked turn.
  xi) wherein the calculating at least one estimated RCS value comprises:
    calculating a radar-beam direction in the aircraft body frame, according to, at least, aspect angles associated with a respective RCS measurement, and a respective candidate airborne object body orientation; and
    estimating RCS according to the candidate aircraft type and the calculated radar-beam direction.
  xii) wherein the estimating RCS according to the candidate aircraft type and the calculated radar-beam direction comprises:
    retrieving an RCS value, according to, at least, the calculated radar-beam direction and the candidate aircraft type, from an RCS database.
  xiii) wherein the calculating a degree of matching between the series of RCS measurements and a series of RCS estimations comprises:
    a) applying empirical mode decomposition to the series of RCS measurements, thereby giving rise to a first group of intrinsic mode functions (IMFs);
    b) applying empirical mode decomposition to the series of RCS estimations, thereby giving rise to a second group of IMFs;
    c) selecting, from the first group of IMFs, an IMF with a highest rate of fluctuations, giving rise to a first selected IMF;

d) selecting, from the second group of IMFs, an IMF with the same frequency as the first selected IMF, giving rise to a second selected IMF; and e) calculating a linear correlation between the first selected IMF and the second selected IMF, resulting in a first correlation value;

thereby giving rise to a degree of matching between the series of RCS measurements and a series of RCS estimations based on a single IMF frequency.

xiv) additionally comprising:

f) selecting, from the first group of IMFs, an IMF with a second-highest rate of fluctuations, giving rise to a third IMF;

g) selecting, from the second group of IMFs, an IMF with the same frequency as the third selected IMF, giving rise to a fourth selected IMF; and h) calculating a linear correlation between the third IMF and the fourth IMF, resulting in a second correlation value; and i) calculating a degree of matching according to the first correlation value and the second correlation value;

thereby giving rise to a degree of matching between the series of RCS measurements and a series of RCS estimations based on two IMF frequencies.

xv) wherein at least one calculated linear correlation is a Pearson correlation coefficient.

xvi) wherein at least one calculated linear correlation is a matched filter.

xvii) wherein the calculated degree of matching according to the first correlation value and the second correlation value is according to the numerical average of first correlation value and the second correlation value.

According to another aspect of the presently disclosed subject matter there is provided a target identification system configured to operate in conjunction with a radar unit and to provide identification of an airborne object according to radar plot data, the target identification system comprising a processing and memory circuitry configured to perform a method for identifying an airborne object, the method comprising:

a) obtaining data indicative of a series of measurements, by a radar, of a radar cross section (RCS) of an airborne object, each RCS measurement being associated with data indicative of aspect angles of the airborne object relative to the radar; and b) calculating a degree of matching between the series of RCS measurements and an estimated RCS time series for a first candidate aircraft type, the estimated RCS time series being calculated according to, at least, i) the data indicative of the aspect angles of at least one RCS measurement of the series of RCS measurements; and ii) at least one candidate airborne object body orientation;

thereby giving rise to a degree of RCS matching indicative of whether the airborne object is identified with the first candidate aircraft type and the least one candidate airborne object body orientation.

According to another aspect of the presently disclosed subject matter there is provided a non-transitory program storage device readable by a processing and memory circuitry, tangibly embodying computer readable instructions executable by the processing and memory circuitry to perform a method of identifying an airborne object, the method comprising:

a) obtaining data indicative of a series of measurements, by a radar, of a radar cross section (RCS) of an airborne object, each RCS measurement being associated with data indicative of aspect angles of the airborne object relative to the radar; and b) calculating a degree of matching between the series of RCS measurements and an estimated RCS time series for a first candidate aircraft type, the estimated RCS time series being calculated according to, at least, i) the data indicative of the aspect angles of at least one RCS measurement of the series of RCS measurements; and ii) at least one candidate airborne object body orientation;

thereby giving rise to a degree of RCS matching indicative of whether the airborne object is identified with the first candidate aircraft type and the least one candidate airborne object body orientation.

According to another aspect of the presently disclosed subject matter there is provided a processor-based method of training a machine learning model, the method comprising:

obtaining a training dataset comprising data indicative of at least one training example;

wherein each training example comprises feature data derivative of an estimated target RCS time series, the estimated target RCS time series having been calculated according to, at least, a series of target aspect angles, a candidate aircraft type, and a candidate aircraft body orientation; and training the machine learning model, according to the training dataset, for identifying an airborne object according to the series of target aspect angles.

In addition to the above features, the method according to this aspect of the presently disclosed subject matter can comprise one or more of features (i) to (iv) listed below, in any desired combination or permutation which is technically possible:

(i) wherein each training example further comprises a label informative of the candidate aircraft type according to which the estimated target RCS time series was calculated.

(ii) wherein the candidate body orientation of at least one training example has been selected according to a flight mode inferred from data indicative of the series of target aspect angles.

(iii) wherein the data derivative of an estimated RCS time series comprises:

a. at least one of: maximum RCS value, minimum RCS value, mean RCS value, RCS time series variance, RCS time series skewness, RCS time series kurtosis, RCS time series energy, RCS time series Hjorth mobility, and RCS time series Hjorth complexity; and b. data derivative of one or more Intrinsic Mode Functions (IMFs), the IMFs being derived according to empirical mode decomposition (EMD) of the estimated RCS time series.

(iv) wherein the data derivative of each IMF of the one or more IMFs includes at least one of: maximum IMF value, minimum IMF value, number of zero crossings, IMF variance, IMF skewness, IMF kurtosis, IMF energy, IMF Hjorth mobility, and IMF Hjorth complexity.

According to another aspect of the presently disclosed subject matter there is provided a processor-based method of identifying an airborne object, the method comprising:

a) obtaining data indicative of a series of target RCS measurements of an airborne object, each RCS measurement being associated with data indicative of aspect angles of the airborne object relative to the radar at a respective time of measurement—thereby giving rise to a series of target aspect angles of the airborne object;

b) preparing a training dataset comprising data indicative of at least one training example,
wherein each training example comprises feature data derivative of an estimated target RCS time series, the estimated target RCS time series having been calculated according to, at least, the series of target aspect angles, a candidate aircraft type, and a candidate aircraft body orientation;

c) training a machine learning model in accordance with any of the methods described herein, and according to the series of target aspect angles of the airborne object; and d) classifying the series of target RCS measurements according to the trained machine learning model, thereby giving rise to an identification of the airborne object with an aircraft type.

In addition to the above features, the method according to this aspect of the presently disclosed subject matter can comprise one or more of features (i) to (iii) listed below, in any desired combination or permutation which is technically possible:

(i) wherein a)-d) are executed in realtime.

(ii) wherein the preparing a training dataset comprises:
for at least one candidate aircraft type and at least one candidate body orientation, calculating an estimated target RCS time series according to the series of target aspect angles; and
for at least one of the estimated RCS time series: extracting features from the estimated RCS time series, thereby giving rise to a training example.

(iii) wherein the machine learning model comprises a neural network comprising an input layer, an output layer, and at least one hidden layer.

According to another aspect of the presently disclosed subject matter there is provided a target identification system configured to operate in conjunction with a radar unit and to provide identification of an airborne object according to radar plot data, the target identification system comprising a processing and memory circuitry configured to perform a method for identifying an airborne object, the method comprising:

a) obtaining data indicative of a series of target RCS measurements of an airborne object, each RCS measurement being associated with data indicative of aspect angles of the airborne object relative to the radar at the time of measurement—thereby giving rise to a series of target aspect angles of the airborne object;

b) preparing a training dataset comprising data indicative of at least one training example,
wherein each training example comprises feature data derivative of an estimated target RCS time series, the estimated target RCS time series having been calculated according to, at least, a series of target aspect angles, a candidate aircraft type, and a candidate aircraft body orientation;

c) training a machine learning model in accordance with any of the methods described herein, and according to the series of target aspect angles of the airborne object; and d) classifying the series of target RCS measurements according to the trained machine learning model, thereby giving rise to an identification of the airborne object with an aircraft type.

According to another aspect of the presently disclosed subject matter there is provided a non-transitory program storage device readable by a processing and memory circuitry, tangibly embodying computer readable instructions executable by the processing and memory circuitry to perform a method of identifying an airborne object, the method comprising:

a) obtaining data indicative of a series of target RCS measurements of an airborne object, each RCS measurement being associated with data indicative of aspect angles of the airborne object relative to the radar at the time of measurement—thereby giving rise to a series of target aspect angles of the airborne object;

b) preparing a training dataset comprising data indicative of at least one training example,
wherein each training example comprises feature data derivative of an estimated target RCS time series, the estimated target RCS time series having been calculated according to, at least, a series of target aspect angles, a candidate aircraft type, and a candidate aircraft body orientation;

c) training a machine learning model in accordance with any of the methods described herein, and according to the series of target aspect angles of the airborne object; and d) classifying the series of target RCS measurements according to the trained machine learning model, thereby giving rise to an identification of the airborne object with an aircraft type.

According to another aspect of the presently disclosed subject matter there is provided a processor-based method of identifying an airborne object, the method comprising:

a) obtaining data indicative of a series of target RCS measurements of an airborne object, each RCS measurement being associated with data indicative of aspect angles of the airborne object relative to the radar at a respective time of measurement—thereby giving rise to a series of target aspect angles of the airborne object;

b) calculating at least one estimated target RCS time series, each estimated target RCS time series being calculated according to, at least, the series of target aspect angles, a candidate aircraft type, and a candidate aircraft body orientation;

c) identifying the airborne object with an aircraft type, in accordance with the at least one estimated target RCS time series, and the series of target RCS measurements.

According to another aspect of the presently disclosed subject matter there is provided a non-transitory program storage device readable by a processing and memory circuitry, tangibly embodying computer readable instructions executable by the processing and memory circuitry to perform a method of identifying an airborne object, the method comprising:

a) obtaining data indicative of a series of target RCS measurements of an airborne object, each RCS measurement being associated with data indicative of aspect angles of the airborne object relative to the radar at a respective time of measurement—thereby giving rise to a series of target aspect angles of the airborne object;

b) calculating at least one estimated target RCS time series, each estimated target RCS time series being calculated according to, at least, the series of target aspect angles, a candidate aircraft type, and a candidate aircraft body orientation;

c) identifying the airborne object with an aircraft type, in accordance with the at least one estimated target RCS time series, and the series of target RCS measurements.

According to another aspect of the presently disclosed subject matter there is provided a non-transitory program storage device readable by a processing and memory circuitry, tangibly embodying computer readable instructions executable by the processing and memory circuitry to perform a method of identifying an airborne object, the method comprising:

a) obtaining data indicative of a series of target RCS measurements of an airborne object, each RCS measurement being associated with data indicative of aspect angles of the airborne object relative to the radar at a respective time of measurement—thereby giving rise to a series of target aspect angles of the airborne object;

b) calculating at least one estimated target RCS time series, each estimated target RCS time series being calculated according to, at least, the series of target aspect angles, a candidate aircraft type, and a candidate aircraft body orientation;

c) identifying the airborne object with an aircraft type, in accordance with the at least one estimated target RCS time series, and the series of target RCS measurements.

According to one aspect of the presently disclosed subject matter there is provided a processor-based method of identifying an airborne object, the method comprising:

a) obtaining data indicative of a series of target Radar Cross Section (RCS) measurements of an airborne object, wherein each target RCS measurement is associated with data indicative of aspect angles of the airborne object relative to a measuring radar at a respective time of measurement, thereby giving rise to a series of target aspect angles of the airborne object;

b) calculating at least one estimation of a candidate aircraft RCS time series, each estimation of a candidate aircraft RCS time series being calculated in accordance with, at least, the series of target aspect angles, a respective candidate aircraft type, and at least one candidate aircraft body orientation; and c) determining data indicative of identification of the airborne object with an aircraft type, in accordance with, at least, the at least one estimation of a candidate aircraft RCS time series, and the series of target RCS measurements.

In addition to the above features, the method according to this aspect of the presently disclosed subject matter can comprise one or more of features (i) to (xvii) listed below, in any desired combination or permutation which is technically possible:

(i) a flight mode was inferred in accordance with the series of target aspect angles of the airborne object; and
at least one candidate airborne object body orientation was selected in accordance with the inferred flight mode.

(ii) wherein calculating at least one RCS value of an estimation of a candidate aircraft RCS time series comprises:
calculating a radar-beam direction in an aircraft body frame, in accordance with, at least, aspect angles associated with a respective target RCS measurement, and a candidate airborne object body orientation of the at least one candidate airborne object body orientations; and
estimating an RCS value in accordance with the calculated radar-beam direction and the respective candidate aircraft type.

iii) wherein the determining data indicative of identification of the airborne object with an aircraft type comprises:
for each estimation of a candidate aircraft RCS time series, calculating a degree of matching between the estimation and the series of target RCS measurements, thereby giving rise to data indicative of identification of the airborne object with the respective candidate aircraft type.

iv) wherein the determining data indicative of identification of the airborne object with an aircraft type comprises:
a) training a machine learning model in accordance with a training dataset comprising at least one training example,
wherein each training example comprises:
i. feature data derivative of an estimation of an candidate aircraft RCS time series of the at least one estimation of a candidate aircraft RCS time series, and
ii. data indicative of the candidate aircraft type in accordance with which the estimation of a candidate aircraft RCS time series was calculated, and
wherein the machine learning model is configured to receive runtime input comprising data indicative of a series of target RCS measurements, and to generate output comprising data indicative of an aircraft type learned to be associated with the input, in accordance with the training of the machine learning model; and
b) providing data indicative of the series of target RCS measurements as input to the trained machine learning model, resulting in output of data indicative of an aircraft type, thereby giving rise to data indicative of identification of the airborne object with an aircraft type.

v) wherein the flight mode was inferred by a method comprising:
selecting the flight mode from a group that includes at least one of: level
flight, ascending flight, descending flight, and banked turn.

vi) wherein the estimating an RCS value in accordance with the calculated radar-beam direction and the respective candidate aircraft type comprises:
retrieving data indicative of an RCS value, according to, at least, the calculated radar-beam direction and the respective candidate aircraft type, from an RCS database.

vii) further comprising:
identifying the candidate aircraft type for which a calculated estimation of a RCS time series gave rise to a best calculated degree of matching,
thereby giving rise to a best match aircraft type.

viii) wherein the calculating a degree of matching between the estimation and the series of target RCS measurements comprises:
a) applying empirical mode decomposition to the series of target RCS measurements, thereby giving rise to a first group of intrinsic mode functions (IMFs);

b) applying empirical mode decomposition to the estimation, thereby giving rise to a second group of IMFs;
c) selecting, from the first group of IMFs, an IMF with a highest rate of fluctuations, giving rise to a first selected IMF;
d) selecting, from the second group of IMFs, an IMF with a same frequency as the first selected IMF, giving rise to a second selected IMF; and
e) calculating a linear correlation between the first selected IMF and the second selected IMF, resulting in a first correlation value;
thereby giving rise to a degree of matching, based on a single IMF frequency, between the estimation and the series of target RCS measurements.
ix) wherein a)-b) are executed in realtime.
x) wherein the machine learning model comprises a neural network comprising an input layer, an output layer, and at least one hidden layer.
xi) wherein the data derivative of an estimation of a candidate aircraft RCS time series comprises:
a) at least one of: maximum RCS value, minimum RCS value, mean RCS value, RCS time series variance, RCS time series skewness, RCS time series kurtosis, RCS time series energy, RCS time series Hjorth mobility, and RCS time series Hjorth complexity; and
b) data derivative of one or more Intrinsic Mode Functions (IMFs), the IMFs being derived according to empirical mode decomposition (EMD) of the estimation.
xii) further comprising:
comparing the best calculated degree of RCS matching to a threshold degree of RCS matching;
thereby giving rise to an indication of whether the airborne object is identified with the best match aircraft type.
xiii) further comprising:
displaying, on a display unit, data informative of the best match aircraft type.
xiv) wherein the calculated linear correlation is a Pearson correlation coefficient.
xv) wherein the calculated linear correlation is a matched filter.
xvi) additionally comprising:
f) selecting, from the first group of IMFs, an IMF with a second-highest rate of fluctuations, giving rise to a third IMF;
g) selecting, from the second group of IMFs, an IMF with a same frequency as the third selected IMF, giving rise to a fourth selected IMF; and
h) calculating a linear correlation between the third IMF and the fourth IMF, resulting in a second correlation value; and
i) calculating a degree of matching in accordance with the first correlation value and the second correlation value;
thereby giving rise to a degree of matching, based on two IMF frequencies, between the estimation and the series of target RCS measurements.
xvii) wherein the data derivative of each IMF of the one or more IMFs comprises at least one of: maximum IMF value, minimum IMF value, number of zero crossings, IMF variance, IMF skewness, IMF kurtosis, IMF energy, IMF Hjorth mobility, and IMF Hjorth complexity.

According to another aspect of the presently disclosed subject matter there is provided a target identification system configured to operate in conjunction with a radar unit and to provide identification of an airborne object according to radar plot data, the target identification system comprising a processing and memory circuitry configured to perform a method for identifying an airborne object, the method comprising:
a) obtaining data indicative of a series of target Radar Cross Section (RCS) measurements of an airborne object, wherein each target RCS measurement is associated with data indicative of aspect angles of the airborne object relative to a measuring radar at a respective time of measurement, thereby giving rise to a series of target aspect angles of the airborne object;
b) calculating at least one estimation of a candidate aircraft RCS time series, each estimation of a candidate aircraft RCS time series being calculated in accordance with, at least, the series of target aspect angles, a respective candidate aircraft type, and at least one candidate aircraft body orientation; and
c) determining data indicative of identification of the airborne object with an aircraft type, in accordance with, at least, the at least one estimation of a candidate aircraft RCS time series, and the series of target RCS measurements.

According to another aspect of the presently disclosed subject matter there is provided a non-transitory program storage device readable by a processing and memory circuitry, tangibly embodying computer readable instructions executable by the processing and memory circuitry to perform a method of identifying an airborne object, the method comprising:
a) obtaining data indicative of a series of target Radar Cross Section (RCS) measurements of an airborne object, wherein each target RCS measurement is associated with data indicative of aspect angles of the airborne object relative to a measuring radar at a respective time of measurement, thereby giving rise to a series of target aspect angles of the airborne object;
b) calculating at least one estimation of a candidate aircraft RCS time series, each estimation of a candidate aircraft RCS time series being calculated in accordance with, at least, the series of target aspect angles, a respective candidate aircraft type, and at least one candidate aircraft body orientation; and
c) determining data indicative of identification of the airborne object with an aircraft type, in accordance with, at least, the at least one estimation of a candidate aircraft RCS time series, and the series of target RCS measurements.

Among the advantages of certain embodiments of the presently disclosed subject matter is the ability to identify an airborne object with a particular aircraft type by utilizing a series of radar plots.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 1a illustrates an example graphical representation of an RCS time series, according to some embodiments of the presently disclosed subject matter

FIG. 3 illustrates an example database structure for mapping the radar beam direction in the aircraft body frame (given, for example: as azimuth and elevation angles) to radar cross section values that have been determined to be characteristic of specific aircraft for a given radar frequency and a given polarization, according to some embodiments of the presently disclosed subject matter;

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "representing", "comparing", "generating", "assessing", "matching", "updating", "calculating", "estimating", "correlating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the "processing and memory circuitry", and "processor" disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

Figure 1:
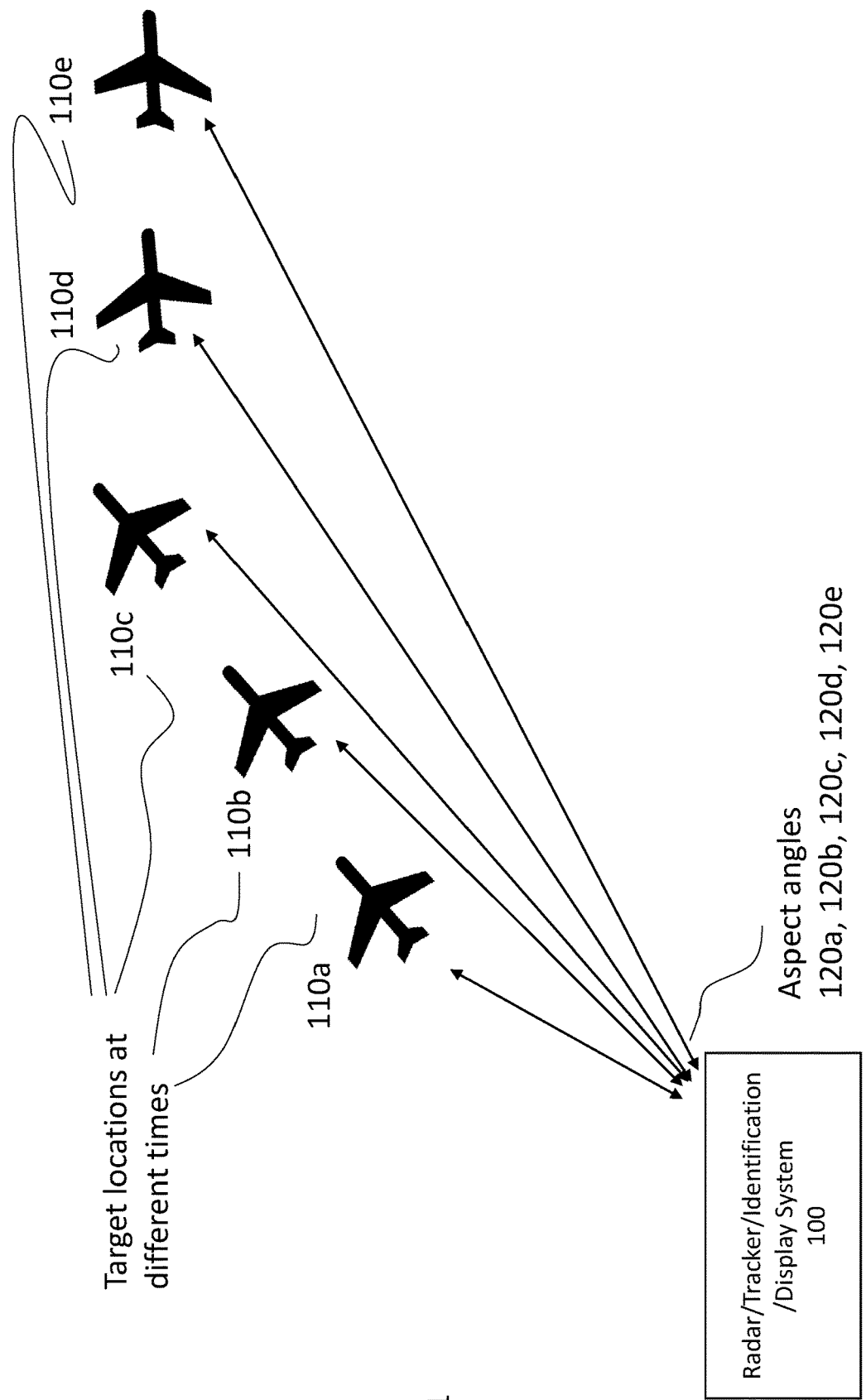
FIG. 1 illustrates a radar system tracking an airborne object over time, according to some embodiments of the presently disclosed subject matter.

Bearing this in mind, attention is drawn to FIG. 1, which illustrates a radar system monitoring an airborne object over time, according to some embodiments of the presently disclosed subject matter.

In some embodiments of the presently disclosed subject matter, an airborne object is monitored over a period of time by a Radar/Tracker/Identification/Display System (100) utilizing, for example, a particular radar frequency and polarization.

In FIG. 1, at a first monitoring time (hereforward referred to as $Time_0$), the airborne object is located at a particular coordinate (110a) and has a particular body orientation.

Using, for example, ordinary radar and tracker mechanisms, Radar/Tracker/Identification/Display System (100) can determine aspect angles (120a) (represented, for example, as azimuth and elevation angles) of the airborne object (i.e. angles relative to Radar/Tracker/Identification/Display System (100) which may itself be moving). Additionally, Radar/Tracker/Identification/Display System (100) can determine the range (i.e. distance) of the airborne object. As is known in the art, the location (coordinates) of the airborne object at $Time_0$ can be determined from, for example, the aspect angles, range and Doppler velocity as determined by Radar/Tracker/Identification/Display System (100).

In some embodiments of the presently disclosed subject matter, at $Time_0$, Radar/Tracker/Identification/Display System (100) additionally detects and records data indicative of the radar cross section (RCS) of the airborne object. By way of non-limiting example, Radar/Tracker/Identification/Display System (100) can detect the signal-to-noise ratio (SNR) of the radar signal at $Time_0$, and derive the RCS from the SNR according to the radar equation—as is known in the art.

In some embodiments of the presently disclosed subject matter, the body orientation of the airborne object (represented, for example, as yaw, pitch, and roll angles) at $Time_0$, is not available at Radar/Tracker/Identification/Display System (100). In some embodiments of the presently disclosed subject matter, this body orientation can be estimated—as will be described in more detail below with reference to FIG. 4. It is noted that in some embodiments of the presently disclosed subject matter, the roll angle can be obtained by the tracker according to the radius of curvature of the aircraft.

Example subsequent times of measurement are hereforward referred to as $Time_1$, $Time_2$, $Time_3$, and $Time_4$. At these times of measurement, the airborne object has respective locations (110b, 110c, 110d, 110e), and respective aspect angles (120b, 120c, 120d, 120e) relative to Radar/Tracker/Identification/Display System (100).

In some embodiments of the presently disclosed subject matter, the airborne object locations, RCS measurements, and times of measurement can be utilized in a method for identifying the airborne object, as will be described hereinbelow.

It is noted that the teachings of the presently disclosed subject matter are not bound by the Radar/Tracker/Identification/Display System and airborne object described with reference to FIG. 1. Equivalent and/or modified functionality can be consolidated or divided in another manner and can be implemented in any appropriate combination of software with firmware and/or hardware and executed on a suitable device. The Radar/Tracker/Identification/Display System can be a standalone network entity, or integrated, fully or partly, with other entities. It will be clear to one skilled in the art how a radar system can be employed in other embodiments such as an airborne system, mobile system etc.

Attention is now directed to FIG. 1a, which illustrates an example graphical representation of an RCS time series, according to some embodiments of the presently disclosed subject matter.

In FIG. 1a, the x axis denotes time, and the y axis denotes an RCS value. Thus there is an RCS plot at each of $Time_0$, $Time_1$, $Time_2$, $Time_3$, and $Time_4$—each respectively indicating an RCS value, such as, for example, an RCS value that might be measured, calculated, or otherwise obtained from radar plot data resulting from monitoring an aircraft as described above with reference to FIG. 1. By way of non-limiting example, RCS values can be obtained from signal-to-noise ratio (SNR) values according to the radar equation. Such a series of time-related RCS values of an airborne object of interest is hereforward referred to as a measured RCS time series (in contrast to an estimated RCS time series to be described hereinbelow).

Figure 2:
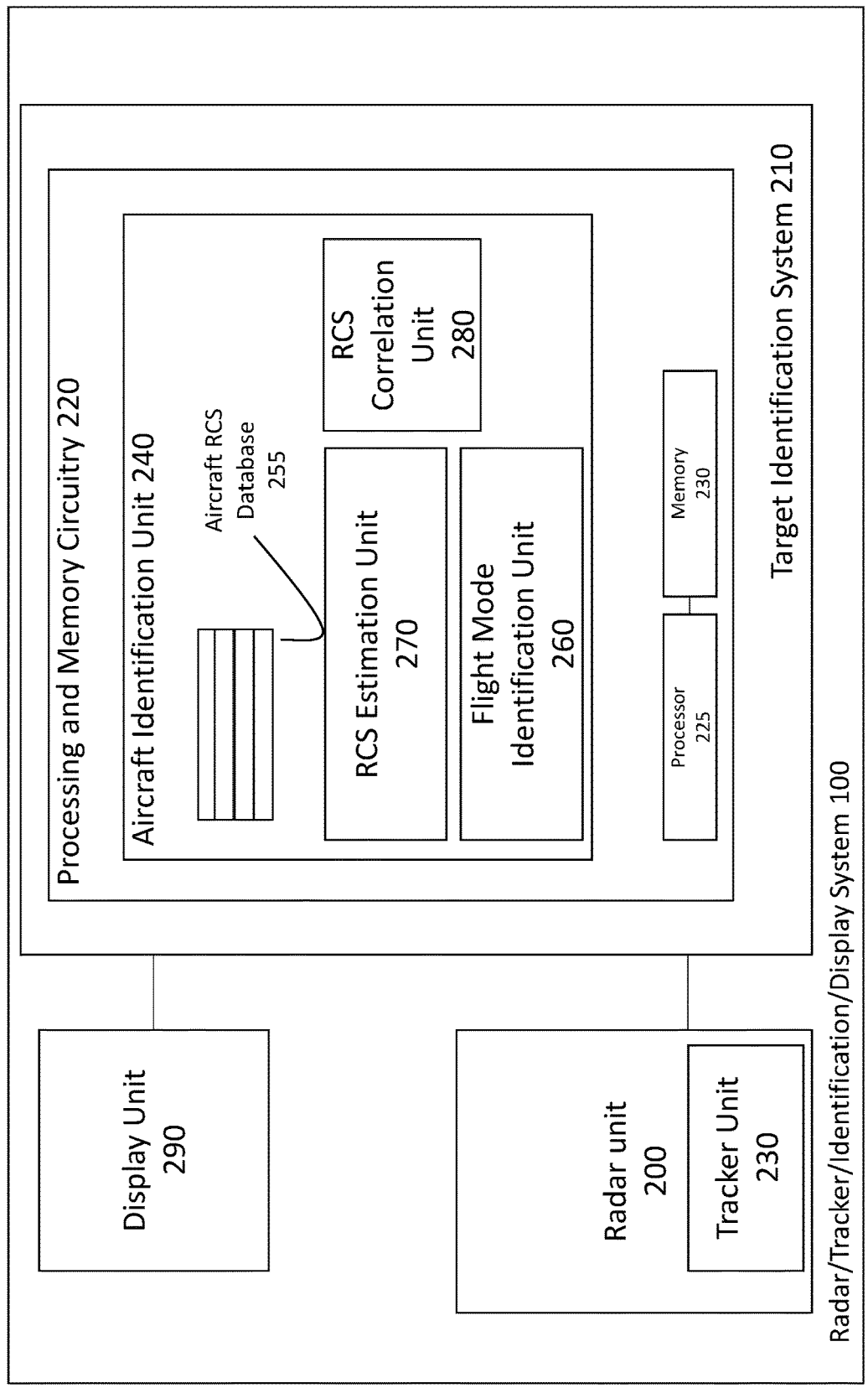
FIG. 2 illustrates a block diagram of an airborne object tracking and identification system and its components, according to some embodiments of the presently disclosed subject matter.

Attention is now directed to FIG. 2, which illustrates a block diagram of an example Radar/Tracker/Identification/Display system (100) for tracking and identification of an airborne object—according to some embodiments of the presently disclosed subject matter.

Radar Unit (200) can be, for example, any kind of stationary or mobile radar unit that can supply radar data (for example: radar plot timestamps, range, elevation and azimuth angles, SNR, Doppler velocity etc.) to target identification system (210). Tracker unit (230) can be, for example, any kind for tracker unit that can supply radar tracking data (for example: target coordinates, target vector velocity etc.) to target identification system (210).

Target identification system (210) can include a processing and memory circuitry (220) which in turn can include, for example, a processor (225) operatively coupled to a memory (230).

A processor (225) can be a hardware-based electronic device with data processing capabilities, such as, for example, a general purpose processor, a specialized Application Specific Integrated Circuit (ASIC), one or more cores in a multicore processor etc. A processor (225) can also consist, for example, of multiple processors, multiple ASICs, virtual processors, combinations thereof etc.

A memory (230) can be, for example, any kind of volatile or non-volatile storage, and can include, for example, a single physical memory component or a plurality of physical memory components. The memory (230) can be configured to, for example, store various data used in computation.

As will be further detailed hereinbelow with reference to FIG. 4-6, the processing and memory circuitry (220) can be configured to execute several functional modules in accordance with computer-readable instructions implemented on a non-transitory computer-readable storage medium. Such functional modules are referred to hereinafter as comprised in the processing and memory circuitry. These modules can include, for example, aircraft identification unit (240).

Aircraft identification unit (240) can perform computations on, for example, radar data (including radar tracking data) received by target identification system (210) for a monitored airborne object and can, for example, determine an identification of the airborne object as, for example, a particular type of aircraft. Target identification system (210) can then, for example, output identification of the aircraft (for example: together with radar plot data) to—for example—display unit (290).

Aircraft identification unit (240) can, in turn, include, for example: flight mode identification unit (260), aircraft RCS database (255), and RCS estimation unit (270). Flight mode identification unit (260) can, for example, analyze radar data (including, for example, radar tracking data) to infer whether a monitored airborne object is, for example ascending, descending, in level flight etc. This type of flight that is inferred for the monitored airborne object is herein termed a "flight mode". An example method for determination of a flight mode of an airborne object from radar data (including, for example, radar tracking data) is described hereinbelow, with reference to FIG. 4.

RCS estimation unit (270) can, for example, estimate RCS series for one or more types of candidate aircraft, according to location data derived from, for example, radar data (including, for example, radar tracking data), and according to body orientation data derived from, for example, inferred flight mode of the monitored airborne object. An example method for estimating an RCS series is described hereinbelow, with reference to FIG. 5. Resulting estimated RCS series for different candidate aircraft can be received by aircraft identification unit (240) and evaluated together with, for example, the measured RCS series of the monitored airborne object in order to determine a best match, and thus an identification of airborne object with a particular type of aircraft. An example method for calculating a degree of matching of two RCS series is described hereinbelow, with reference to FIG. 6.

Aircraft RCS database (255) can be, for example, a software database implemented using an appropriate database technology. In some embodiments of the presently disclosed subject matter, aircraft RCS database (255) includes table entries which map the direction of the radar beam in the aircraft body frame (for example: represented as azimuth and elevation angles) to, for example, previously observed RCS values for particular aircraft. Aircraft RCS database (255) can be utilized, for example, by RCS estimation unit (270) in its estimation of RCS series for candidate aircraft. Details of an example Aircraft RCS database (255) structure are shown below, with reference to FIG. 3.

Display unit (290) can be, for example, any kind of display system or monitor suitable for depiction of, for example, radar tracking and aircraft identification data. By way of non-limiting example, display unit (290) can be a computer monitor, laptop computer, tablet, mobile phone etc.

Display unit (290) can be, for example, operably connected to target identification system (210) via, for example, a conventional electronics communication connection of an appropriate type.

It is noted that the teachings of the presently disclosed subject matter are not bound by the Radar/Tracker/Identification/Display system and associated components described with reference to FIG. 2. Equivalent and/or modified functionality can be consolidated or divided in another manner and can be implemented in any appropriate combination of software with firmware and/or hardware and executed on a suitable device.

Attention is now directed to FIG. 3, which illustrates an example database structure for mapping the radar beam direction in the aircraft body frame (given, for example: as azimuth and elevation angles) to radar cross section values that have been determined to be characteristic of specific aircraft for a given radar frequency and a given polarization, according to some embodiments of the presently disclosed subject matter.

In some embodiments of the presently disclosed subject matter, aircraft RCS database (255) consists of a group of tables. Each table in this group of tables pertains to a particular aircraft type, and a particular frequency and particular polarization of the radar. Each of these tables, in turn, consists of a series of table entries, where each table entry maps a particular azimuth/elevation angle pair to an RCS value.

By way of non-limiting example, aircraft RCS database table (310) supplies RCS estimates for an aircraft of type "abc-123" (for a particular radar frequency and polarization value). Aircraft RCS database table (310) includes table entries in which azimuth and elevation angles appear in increments of 0.5 degrees. In other examples, larger or smaller increments can be used. Similarly, other aircraft RCS database tables (320, 330) supplies RCS estimates for aircraft of types "abc-567" and "ZZ" respectively.

In some embodiments of the presently disclosed subject matter, the RCS value contained in the table entry can be derived—in advance of system deployment—from actual radar monitoring of the specific aircraft type at the indicated azimuth and elevation angles with radar of a particular frequency and polarization value. In other embodiments of the presently disclosed subject matter, the RCS value can be derived using other suitable means.

It is noted that the number of tables included in aircraft RCS database (255) can vary according to the particular embodiment (by way of non-limiting example: in some embodiments, the number of the tables in the database is identical with the number of aircraft types recognized by the target recognition system (210)).

It is noted that tables in aircraft RCS database (255) are applicable for a particular radar frequency and polarization, and that embodiments of the invention can maintain data for, for example, multiple radar frequencies or polarities, and can accordingly utilize a modified RCS database structure (for example: with RCS values for multiple frequencies or multiple polarization stored within a single table entry).

It is noted that the structure of the tables in aircraft RCS database (255) is for illustration purposes only, and that other structures are possible. It is further noted that the tables in aircraft RCS database (255) can include RCS values, or data indicative of RCS values.

It is noted that the teachings of the presently disclosed subject matter are not bound by the aircraft RCS database described with reference to FIG. 3. Equivalent and/or modified functionality can be consolidated or divided in another manner and can be implemented in any appropriate combination of software with firmware and/or hardware and executed on a suitable device.

Figure 4:
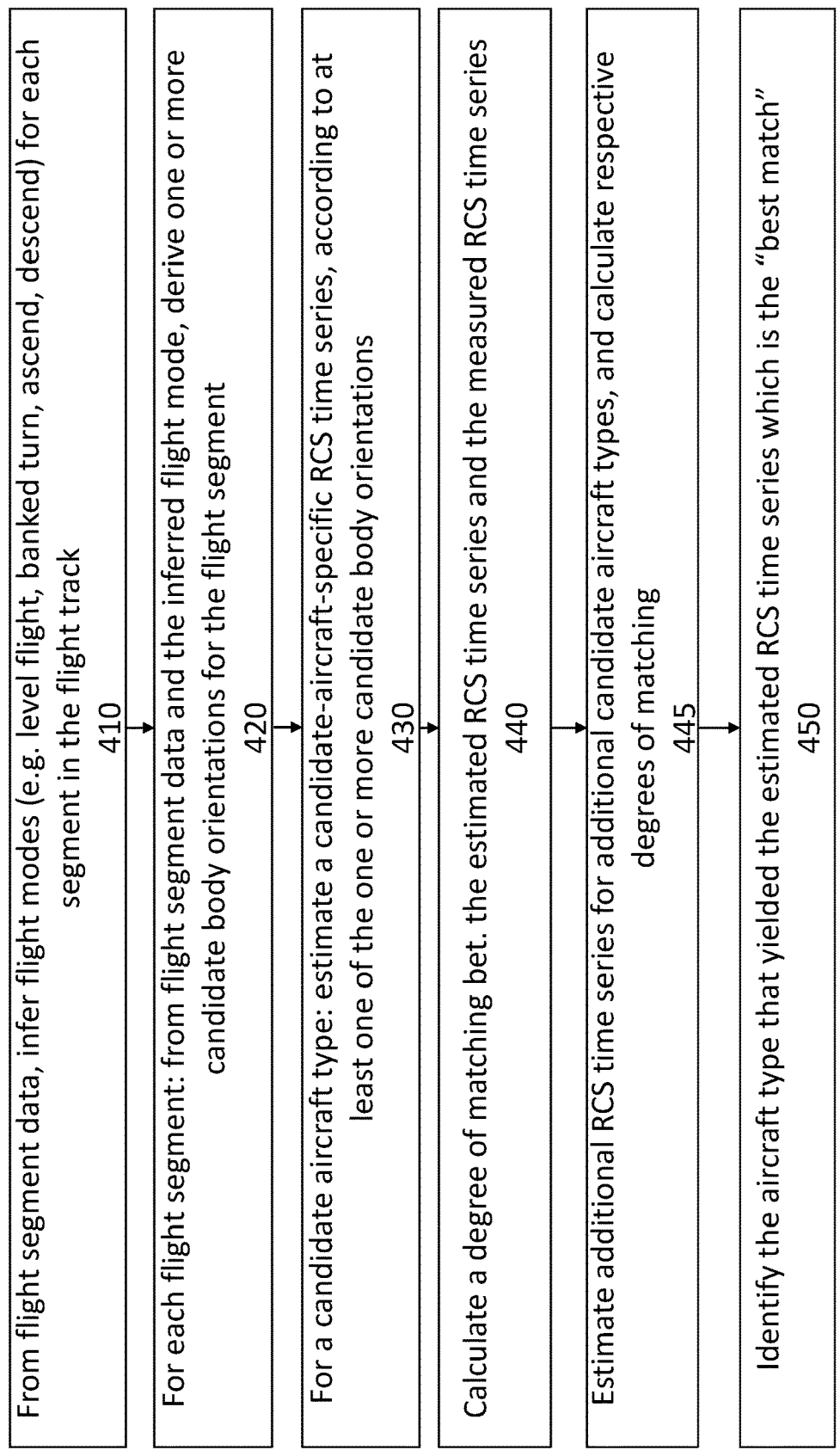
FIG. 4 illustrates a generalized flow diagram of a computerized process for identifying an aircraft on the basis of radar plot information and radar cross section information, according to some embodiments of the presently disclosed subject matter.

Attention is now drawn to FIG. 4 which illustrates a generalized flow diagram of an example computerized process for identifying an aircraft on the basis of radar plot data (including, for example, radar tracking data and radar cross section data), according to some embodiments of the presently disclosed subject matter.

A series of radar plots with a single identifiable and stable flight mode is hereforward termed a flight segment. Thus, within the radar plots of a flight segment, airborne object coordinates and vector velocity data are, for example, consistent with one of the flight modes such as, for example, level flight, ascending flight, descending flight, or banked turn. In some embodiments of the presently disclosed subject matter, a flight segment consists of 5 or more radar plots. A series of radar plots in which every radar plot belongs to a flight segment (but not necessarily the same flight segment) is hereforward termed a flight track.

The process illustrated in FIG. 4 pertains, by way of non-limiting example, to a flight track.

In some embodiments of the presently disclosed subject matter, the grouping of radar plots (received in real time) into a flight track can be performed by aircraft identification unit (240) prior to the execution of the aircraft identification method of FIG. 4. Accordingly, the method illustrated in FIG. 4 applies, for example, to data of radar plots which are part of a flight track consisting of one or more identified flight segments. In some embodiments of the presently disclosed subject matter, there can exist failure conditions that can render the method non-applicable (e.g. the available flight track data includes too few plots).

In other embodiments of the presently disclosed subject matter (not described here in detail), the grouping of the radar plots (received in real time) into a flight track can be performed by flight mode identification unit (260) in a manner integrated with the flight mode identification method described hereinbelow (so that the methods for flight segment/flight track identification are performed in a manner that is interleaved with the method for flight mode identification).

The per-plot radar data that is utilized by the method of FIG. 4 can include, for example per-plot Radar Cross Section (RCS) value.

The per-plot radar data that is utilized by the method of FIG. 4 can further include, by way of non-limiting example, the following parameters:
  Aspect angles relative to the radar
  time of measurement
  ground reference frame coordinates (for example: in NED (North-East-Down) format)
  instantaneous vector velocity (as determined by, for example, tracker unit (230))

This per-plot information associated with the radar monitoring of a particular airborne object over a particular flight segment is herein referred to as "flight segment data" for the plots of the flight segment.

In some embodiments of the presently disclosed subject matter, tracker unit (230) and/or radar unit (200) can provide flight segment data. In some embodiments of the presently disclosed subject matter, tracker unit (230) and/or radar unit (200) can provide data indicative of flight segment data.

In the following description, parameters of flight segment data can be described as "associated with" other parameters of the same radar plot, or as "associated with data indicative of the other parameters. For example, the RCS of a particular radar plot can be described as associated with data indicative of aspect angles relative to the radar.

Thus, flight segment data can include:
  data indicative of a series of target RCS measurements of an airborne object" i.e. a series of RCS measurements from a series of radar plots of a monitored airborne object—where each RCS measurement is associated with the aspect angles between the radar and the airborne object at the time of the measurement (for example: represented as azimuth and elevation).

for each target RCS measurement: associated data indicative of aspect angles of the airborne object relative to a measuring radar at a respective time of measurement In some embodiments of the presently disclosed subject matter, target identification system (210) (for example: flight mode identification unit (260)) can obtain flight segment data (as described above) and infer (410) a flight mode from the flight segment data (for example: for each flight segment in a flight track).

In some embodiments of the presently disclosed subject matter, target identification system (210) (for example: flight mode identification unit (260)) selects a flight mode from the following recognized flight modes: level flight, banked turn, ascending flight, descending flight. In some embodiments, target identification system (210) (for example: flight mode identification unit (260)) selects a flight mode from a group that includes at least one of: level flight, banked turn, ascending flight, and descending flight. In other embodiments, more, fewer, or different flight modes can, for example, be recognized. Example methods for inferring a flight mode are described hereinbelow.

Target identification system (210) (for example: flight mode identification unit (260)) can, for example, identify a flight mode for a flight segment according to, for example, the following non-limiting criteria:

If altitude and 3-axis direction of the airborne object (as indicated by the coordinates and vector velocity data) are both substantially constant for all the radar plots in the flight segment, then the flight mode can be identified as level flight. In some embodiments of the presently disclosed subject matter, substantially constant altitude can include variations in altitude that occur in regular level flight. In some embodiments of the presently disclosed subject matter, substantially constant 3-axis direction can include variations in direction that occur in regular level flight (for example: +/−3 degrees).

It is noted that—in flight segments identified with level flight—even though the flight direction is substantially constant, the absolute value of the velocity is not constant.

In a banked turn, an aircraft rolls to turn in a substantially constant radius—for example: to change flight direction.

If two segments of level flight are separated by a series of radar plots which lack the characteristics of level flight, then the curvature of the plots in this series can be examined. If the curvature has substantially constant radius, then the flight mode can be identified as banked turn. In some embodiments of the presently disclosed subject matter, substantially constant curvature radius can include variations in curvature radius that occur in regular in-flight turning (for example: variation in roll angle of +/−3 degrees).

In other embodiments of the presently disclosed subject matter, the horizontal velocity direction $$\left(\sigma = a\tan\left(\frac{V_Y}{V_X}\right)\right)$$

is calculated. If the direction derivative ($\dot{\sigma}$) is substantially constant, then the flight mode can be identified as banked turn. In some embodiments of the presently disclosed subject matter, a substantially constant direction derivative can include variations in direction derivative that occur in regular in-flight turning.

In ascending or descending flight, the aircraft keeps a constant positive or negative pitch angle. If the pitch angle is substantially constant and positive, and the altitude is correspondingly increasing, then the flight mode can be identified as ascending flight. If pitch angle is substantially constant and negative, and the altitude is correspondingly decreasing, then the flight mode can be identified as descending flight. In some embodiments of the presently disclosed subject matter, substantially constant pitch angle can include variations in pitch angle that occur in regular ascending or descending flight (for example: +/−5 degrees).

Using the inferred flight mode, target identification system (210) (for example: flight mode identification unit (260)) can next select (420) one or more candidate body orientations for the flight segment (where a body orientation is represented, for example, as a vector consisting of yaw angle, pitch angle, and roll angle).

By way of non-limiting example, target identification system (210) (for example: flight mode identification unit (260)) can derive candidate ranges of yaw angles, pitch angles, and roll angles (e.g. in the ground reference frame and in the NED representation). Target identification system (210) (for example: flight mode identification unit (260)) can then determine discrete candidate values for yaw angle, pitch angle, and roll angle respectively—for example: by incrementally selecting, for example, each degree or, for example, each half-degree angle value between the minimum and the maximum values of the range. Target identification system (210) (for example: flight mode identification unit (260)) can then create a set of candidate body orientations by composing vectors consisting of all combinations of the candidate yaw, pitch, and roll angle values.

By way of non-limiting example:
If flight mode is level flight:
Pitch angle can be estimated to be, for example, between 0 and 20 degrees (as aircraft can stall when pitch angle is beyond 20 degrees)
Yaw angle can be estimated to be, for example, in a range equivalent to the flight path direction with a possible variation of, for example, +/−10 degrees (the variation can depend, for example, on wind)
Roll angle can, for example, be estimated to be 0 with a possible variation of, for example, +/−2 degrees.
Thus:
Candidate pitch values can be, for example: 0 degrees, 0.5 degrees, 1 degree, and so on . . . up to 20 degrees.
Candidate yaw values can be, for example: −10 degrees, −9.5 degrees, and so on . . . up to 20 degrees.
Candidate roll values can be, for example: −2 degrees, −1.5 degrees, and so on . . . up to 2 degrees.
The set of candidate body orientations can be a set of {pitch, yaw, roll} vectors consisting of all combinations of the candidate pitch, yaw, and roll values.

If flight mode is ascending flight:
  Pitch angle can be estimated to be, for example, equivalent to the angle of ascent with a possible variation of 0 to 20 degrees (as aircraft can stall when pitch is beyond 20 degrees)
  Yaw angle can be estimated to be, for example, in a range equivalent to the flight path direction with a possible variation of, for example, +/−10 degrees (the variation can depend, for example, on wind)
  Roll angle can be estimated to be, for example, 0—with a possible variation of, for example, +/−2 degrees.
If flight mode is descending flight:
  Pitch angle can be estimated to be, for example, equivalent to the angle of descent with a possible variation of, for example, +/−2-3 degrees.
  Yaw angle can be estimated to be, for example, in a range equivalent to the flight path direction with a possible variation of, for example, +/−10 degrees (the variation can depend, for example, on wind)
  Roll angle can be estimated to be, for example, 0—with a possible variation of, for example, +/−2 degrees.
If flight mode is banked turn:
  Pitch angle can be estimated to be, for example, equivalent to the angle of ascent plus an additional 0 to 20 degrees (if aircraft is ascending) or angle of descent with a variation of, for example, 2-3 degrees (if aircraft is descending).
  Yaw angle can be estimated to be, for example, in a range equivalent to the flight path direction with a variation of, for example +/−10 degrees
  Roll angle can be estimated as, for example, $$\tan(\phi) = \frac{V^2}{R \cdot g}$$

where v is the velocity and R is the turn curvature—with a possible variation of, for example, +/−2-3 degrees. This is derived from the observation that:

$$mg = L \cdot \cos(\phi)$$
$$ma = m\frac{V^2}{R} = L \cdot \sin(\phi) = mg \cdot \tan(\phi)$$

It is noted that in some embodiments, target identification system (210) (for example: flight mode identification unit (260)) can select candidate body orientations using means other than an inferred flight mode.

Target identification system (210) (for example: RCS estimation unit (260)) can next estimate (430) an RCS time series for a first candidate aircraft type.

In calculating an estimation of a candidate aircraft RCS time series, target identification system (210) (for example: RCS estimation unit (260)) can utilize, for example: the radar plot measurement times of the flight track data, the radar plot aspect angles of the flight track data, and a candidate body orientation (e.g. from the candidate body orientations computed for a particular flight segment).

It is noted that aspect angles associated with the respective RCS measurements of the series of RCS measurements can be indicative of the flight path taken by the airborne object. Thus, target identification system (210) (for example: RCS estimation unit (260)) can, for example, estimate an RCS time series that would, for example, result from an aircraft of the candidate aircraft type flying in the path indicated by the aspect angles values associated with some or all of the RCS measurements of the series of RCS measurements. The term "the series of target aspect angles of the airborne object" as used herein includes such a series of aspect angles associated with the respective RCS measurements (for example: of a flight segment).

By way of non-limiting example: in some embodiments of the presently disclosed subject matter, target identification system (210) (for example: RCS estimation unit (260)) can estimate RCS—for the candidate aircraft type—for each aspect angles value associated with each measurement of the series of RCS measurements. Target identification system (210) (for example: RCS estimation unit (260)) can then create an estimated RCS time series by mapping the measurement times of the original RCS measurements to the corresponding RCS estimations for the candidate aircraft type (for example: as illustrated in FIG. 1a above).

In other embodiments of the presently disclosed subject matter, target identification system (210) (for example: RCS estimation unit (260)) can estimate RCS values for, for example, aspect angles associated with a subset of the RCS measurements of the series of RCS measurements.

In other embodiments of the presently disclosed subject matter, target identification system (210) (for example: RCS estimation unit (260)), can estimate an RCS time series by utilizing flight segment data in another manner.

It is noted that the RCS resulting from radar tracking of a given aircraft type can be affected by body orientations of the tracked aircraft.

Accordingly, in some embodiments of the presently disclosed subject matter, target identification system (210) (for example: RCS estimation unit (260)) can utilize a single candidate body orientation (for example: selected from the set of candidate body orientations calculated for a flight segment) to estimate an RCS time series representing—for example—estimated RCS of the candidate aircraft type flying with the particular body orientation (e.g. with the body orientation being stable within a flight segment).

Alternatively, in some embodiments of the presently disclosed subject matter, target identification system (210) (for example: RCS estimation unit (260)) can utilize multiple candidate body orientations (for example: selected from the set of candidate body orientations calculated for a flight segment) to estimate a RCS time series representing—for example—estimated RCS of the candidate aircraft type flying with a particular series of body orientations within the flight segment.

In some embodiments of the presently disclosed subject matter, target identification system (210) (for example: RCS estimation unit (260)) can utilize candidate body orientations in other manners.

By way of non-limiting example: in some embodiments of the presently disclosed subject matter, target identification system (210) (for example: RCS estimation unit (260)) can estimate RCS—for the candidate aircraft type—for each aspect angles value associated with each measurement of the series of RCS measurements. In estimating these RCS values, target identification system (210) (for example: RCS estimation unit (260)) can utilize a single candidate body orientation (for example: selected from the set of candidate body orientations calculated for a flight segment) to estimate an RCS time series representing—for example—estimated RCS of the candidate aircraft type flying with the particular body orientation. Target identification system (210) (for example: RCS estimation unit (260)) can then create an estimated RCS time series by mapping the measurement times of the original RCS measurements to the corresponding RCS estimations for the candidate aircraft type (for example: as illustrated in FIG. 1a above). In other embodiments of the presently disclosed subject matter, target identification system (210) (for example: RCS estimation unit (260)) can instead utilize multiple candidate body orientations to estimate the RCS time series.

An example method for RCS estimation is described below, with reference to FIG. 5.

Target identification system (210) (for example: RCS estimation unit (260)) can next calculate (440)—for the estimated RCS series associated with the first candidate aircraft type—a degree of matching between the estimated RCS series and the measured RCS time series. In some embodiments of the presently disclosed subject matter, the degree of RCS matching can be indicative of whether the airborne object is identified with the candidate aircraft type and the candidate body orientation(s) used in estimating the RCS time series.

Details of an example method for calculating degree of matching are described below, with reference to FIG. 6.

In some embodiments of the presently disclosed subject matter, the calculation of the degree of matching can consist of providing, for example, RCS series data, to, for example, a deep learning system which determines the degree of matching of the two RCS time series, according to, for example, a previously processed set of training data.

It is noted that the calculating of a degree of matching between an estimated RCS series and the measured RCS time series can be performed subsequent to the calculation of multiple estimated RCS series.

In some embodiments of the presently disclosed subject matter, target identification system (210) (for example: RCS estimation unit (260)) can next estimate additional RCS time series for the first candidate aircraft type and (in some embodiments) also the degrees of matching for the additional estimated RCS time series. For example: target identification system (210) (for example: RCS estimation unit (260)) can estimate (430) an RCS time series using, for example, a method described hereinabove (430), but utilizing a different single candidate body angle (or different multiple candidate body angles) in the estimation. Target identification system (210) (for example: RCS estimation unit (260)) can calculate a degree of matching for each new estimated RCS time series using, for example, a method described hereinabove (440).

In some embodiments of the presently disclosed subject matter, target identification system (210) (for example: RCS estimation unit (260)) can next estimate additional RCS time series (445) for one or more additional candidate aircraft types and also the degrees of matching for the additional estimated RCS time series. For example: target identification system (210) (for example: RCS estimation unit (260)) can estimate (430) an RCS time series for the additional candidate aircraft type using, for example, a method described previously. Target identification system (210) (for example: RCS estimation unit (260)) can then estimate (442) additional RCS time series, for example by utilizing a different single candidate body angle (or different multiple candidate body angles) in the estimation. Target identification system (210) (for example: RCS estimation unit (260)) can calculate a degree of matching for each new estimated RCS time series using, for example, a method described hereinabove (440).

In some embodiments of the presently disclosed subject matter, the RCS time series estimations performed by target identification system (210) (for example: RCS estimation unit (260)) can result in, for example, hundreds or thousands of RCS time series estimations and associated degrees of matching.

In summary, in some embodiments, target identification system (210) (for example: RCS estimation unit (260)) can calculate at least one estimation of a candidate aircraft RCS time series. Each of the estimations of a candidate aircraft RCS time series can be calculated in accordance with the series of target aspect angles, a respective candidate aircraft type, and at least one candidate aircraft body orientation.

Target identification system (210) (for example: RCS correlation unit (260)) can next identify (450) the candidate aircraft type for which the RCS time series that is a best match for the measured RCS time series (as indicated by the best resulting degree of matching) was estimated. This estimated RCS time series can thus, for example, be indicated as a best match to the measured RCS time series. The candidate aircraft type for which the RCS series was estimated can thus, for example, be indicated as a best match aircraft type.

In some embodiments of the presently disclosed subject matter, Target identification system (210) (for example: RCS correlation unit (260)) can, for example, compare the highest calculated degree of RCS matching to a threshold degree of RCS matching. Target identification system (210) (for example: RCS correlation unit (260)) can then, for example, determine whether the airborne object is identified with the best match aircraft type according to whether the degree of RCS matching meets the threshold degree of RCS matching.

In some embodiments of the presently disclosed subject matter, target identification system (210) (for example: RCS correlation unit (260)) can, for example, compare the difference between the best calculated degree of RCS matching and the second best calculated degree of RCS matching (for example: if the degree of matching is represented as a correlation value between 0 and 1, the second highest can be subtracted from the highest). Target identification system (210) (for example: RCS correlation unit (260)) can then, for example, compare the difference in degree of matching to a threshold difference in degree of matching (for example: to a minimum difference in correlation value). If the difference in degree of matching meets the threshold difference in degree of matching, then target identification system (210) (for example: RCS correlation unit (260)) can, for example, determine that the airborne object is identified with the best match aircraft type. If the difference in degree of matching does not meet the threshold difference in degree of matching, then target identification system (210) (for example: RCS correlation unit (260)) can, for example, determine that the airborne object remains unidentified.

In some embodiments of the presently disclosed subject matter, target identification system (210) (for example: RCS correlation unit (260)) can, for example, cause the name of the best match aircraft type (or data informative thereof) to appear on, for example, display unit (290). In some embodiments of the presently disclosed subject matter, target identification system (210) (for example: RCS correlation unit (260)) can, for example, cause an indication—for example: of whether the best match aircraft type is identified with the airborne object—to appear on, for example, display unit (290).

It is noted that the teachings of the presently disclosed subject matter are not bound by the flow chart illustrated in FIG. 4, the illustrated operations can occur out of the illustrated order. For example, operations 440 and 445, shown in succession, can be executed substantially concurrently, or in the reverse order. It is also noted that whilst the flow chart is described with reference to elements of the system of FIG. 1 or 2, this is by no means binding, and the operations can be performed by elements other than those described herein.

Figure 5:
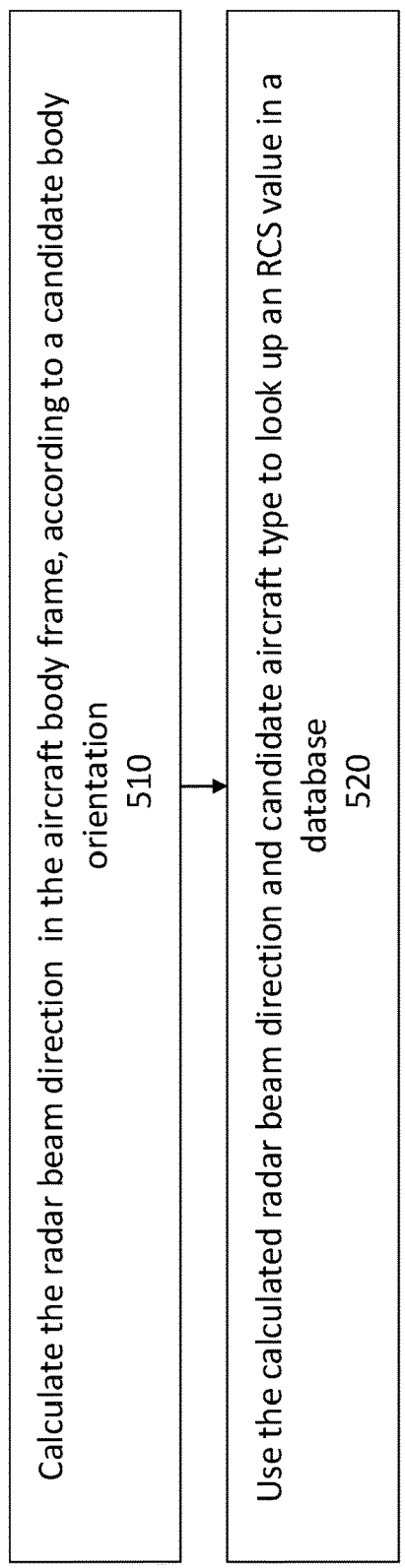
FIG. 5 illustrates a generalized flow diagram of an example computerized process for determining a radar cross section value for a particular aircraft type, according to some embodiments of the presently disclosed subject matter.

Attention is now drawn to FIG. 5 which illustrates a generalized flow diagram of an example computerized process for estimating a radar cross section (RCS) value for a particular candidate aircraft type, and for particular measured flight segment data, and for a particular candidate body orientation, according to some embodiments of the presently disclosed subject matter.

Target identification system (210) (for example: RCS estimation unit (260)) can repeatedly utilize the method of FIG. 5 to—for example—estimate an RCS value corresponding to each RCS measurement of the monitored airborne object (as described hereinabove with reference to FIG. 4).

Target identification system (210) (for example: RCS estimation unit (260)) can calculate (510) the radar beam direction in the aircraft body frame, according to, for example, aspect angles relative to the radar (for example: the aspect angles associated with an RCS measurement of the series of RCS measurements) and a respective candidate body orientation (for example: a candidate airborne object body orientation estimated on the basis of an inferred flight mode of the RCS measurement). It is noted that methods for calculation of an radar beam direction in the aircraft body frame based on aspect angles relative to the radar and a body orientation are known in the art.

Target identification system (210) (for example: RCS estimation unit (260)) can next utilize the calculated radar beam direction in the aircraft body frame (e.g. represented as azimuth and elevation angles) to, for example, retrieve (520) an RCS value from an RCS database (255). RCS database (255) can be accessed according to candidate aircraft type and radar beam direction in the aircraft body frame (e.g. azimuth and elevation angles) as described hereinabove with reference to FIG. 3.

It is noted that the teachings of the presently disclosed subject matter are not bound by the flow chart illustrated in FIG. 5. It is also noted that whilst the flow chart is described with reference to elements of the system of FIGS. 1-3, this is by no means binding, and the operations can be performed by elements other than those described herein.

Figure 6:
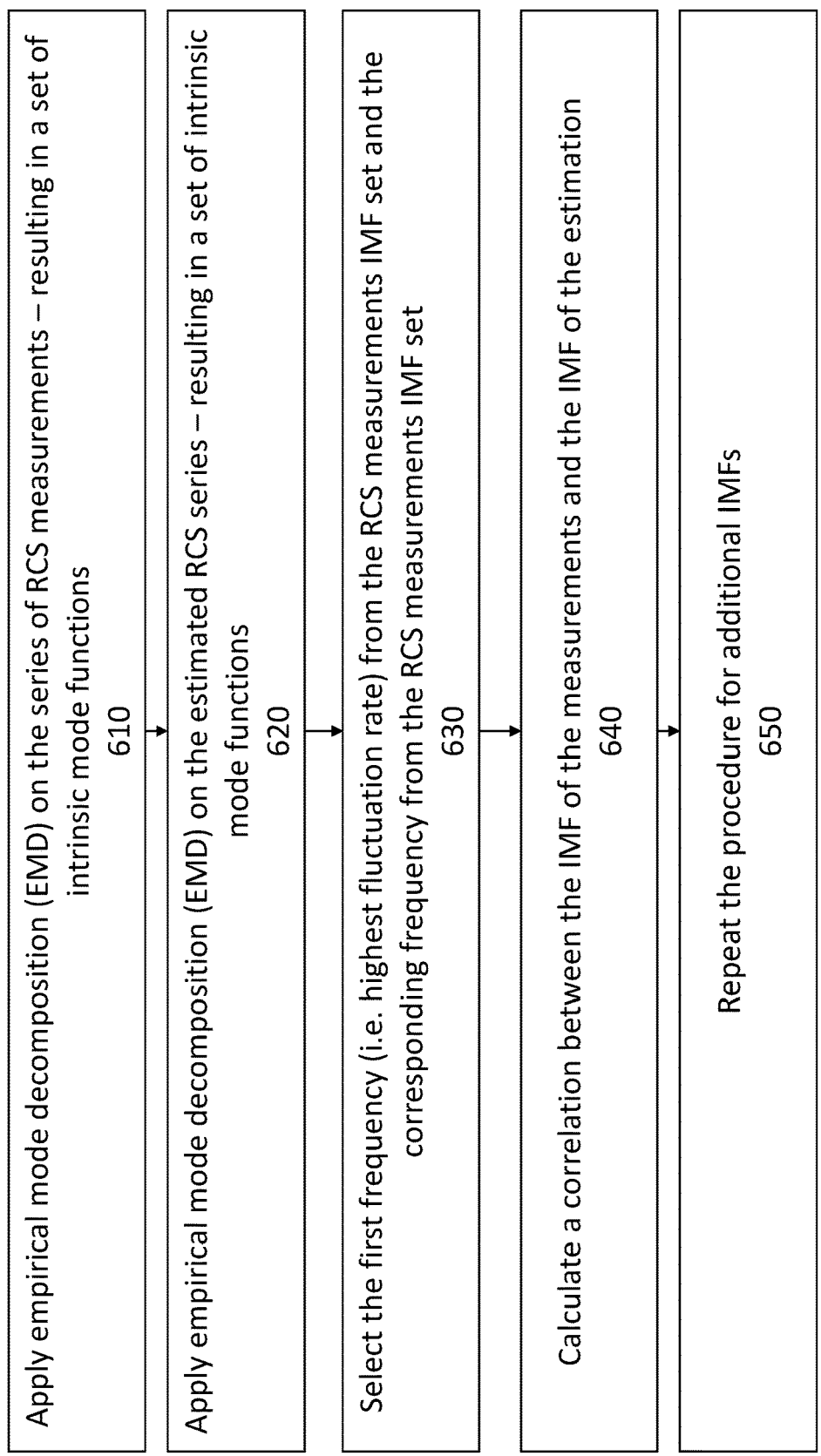
FIG. 6 illustrates a generalized flow diagram of a computerized process for calculating a degree of matching between a series of RCS measurements and an estimated RCS series, according to some embodiments of the presently disclosed subject matter.

Attention is now drawn to FIG. 6 which illustrates a generalized flow diagram of a computerized process for calculating a degree of matching between a series of RCS measurements and an estimated RCS series, according to some embodiments of the presently disclosed subject matter.

Target identification system (210) (for example: RCS correlation unit (280)) can, for example, apply empirical mode decomposition (EMD) (610) to the series of RCS measurements—resulting in a first set of Intrinsic Mode Functions (IMFs).

Target identification system (210) (for example: RCS correlation unit (280)) can next, for example, apply EMD (620) to the estimated RCS series—resulting in a second set of intrinsic mode functions.

Target identification system (210) (for example: RCS correlation unit (280)) can next, for example, select (630) the first frequency (i.e. highest fluctuation rate) from the RCS measurements IMF set and the corresponding frequency from the RCS estimations IMF set. It is noted in that some embodiments of the presently disclosed subject matter, this frequency is preferred as it can be the least noisy frequency of the IMF set.

Target identification system (210) (for example: RCS correlation unit (280)) can next, for example, calculate a linear correlation (640) between the IMF of the measurements and the IMF of the estimation.

In some embodiments of the presently disclosed subject matter, the calculation of the linear correlation can consist of performing a linear correlation method (for example: Pearson Correlation Coefficients (PCC), Matched filter etc.) which can result in—for example—a value (for example: a number between 0 and 1) that is indicative of the degree of matching of the two RCS series.

In some embodiments of the presently disclosed subject matter, target identification system (210) (for example: RCS correlation unit (280)) can additionally (650) compute a second correlation value by selecting the frequency with the second-highest fluctuation rate from the RCS measurements IMF set and computing a correlation with the corresponding frequency of the RCS estimations IMF set. In some such embodiments, target identification system (210) (for example: RCS correlation unit (280)) can compute, for example, the average of the first correlation value and the second correlation value—resulting in a degree of matching of the two RCS series.

In some embodiments of the presently disclosed subject matter, target identification system (210) (for example: RCS correlation unit (280)) can compute additional correlation values based on additional IMF sets.

In some embodiments of the presently disclosed subject matter, target identification system (210) (for example: RCS correlation unit (280)) can compute only a single correlation value based on a single additional IMF set.

It is noted that the teachings of the presently disclosed subject matter are not bound by the flow chart illustrated in FIG. 6, the illustrated operations can occur out of the illustrated order. For example, operations 610 and 620 shown in succession, can be executed substantially concurrently, or in the reverse order. It is also noted that whilst the flow chart is described with reference to elements of the system of FIG. 1 or 2, this is by no means binding, and the operations can be performed by elements other than those described herein.

Figure 2A:
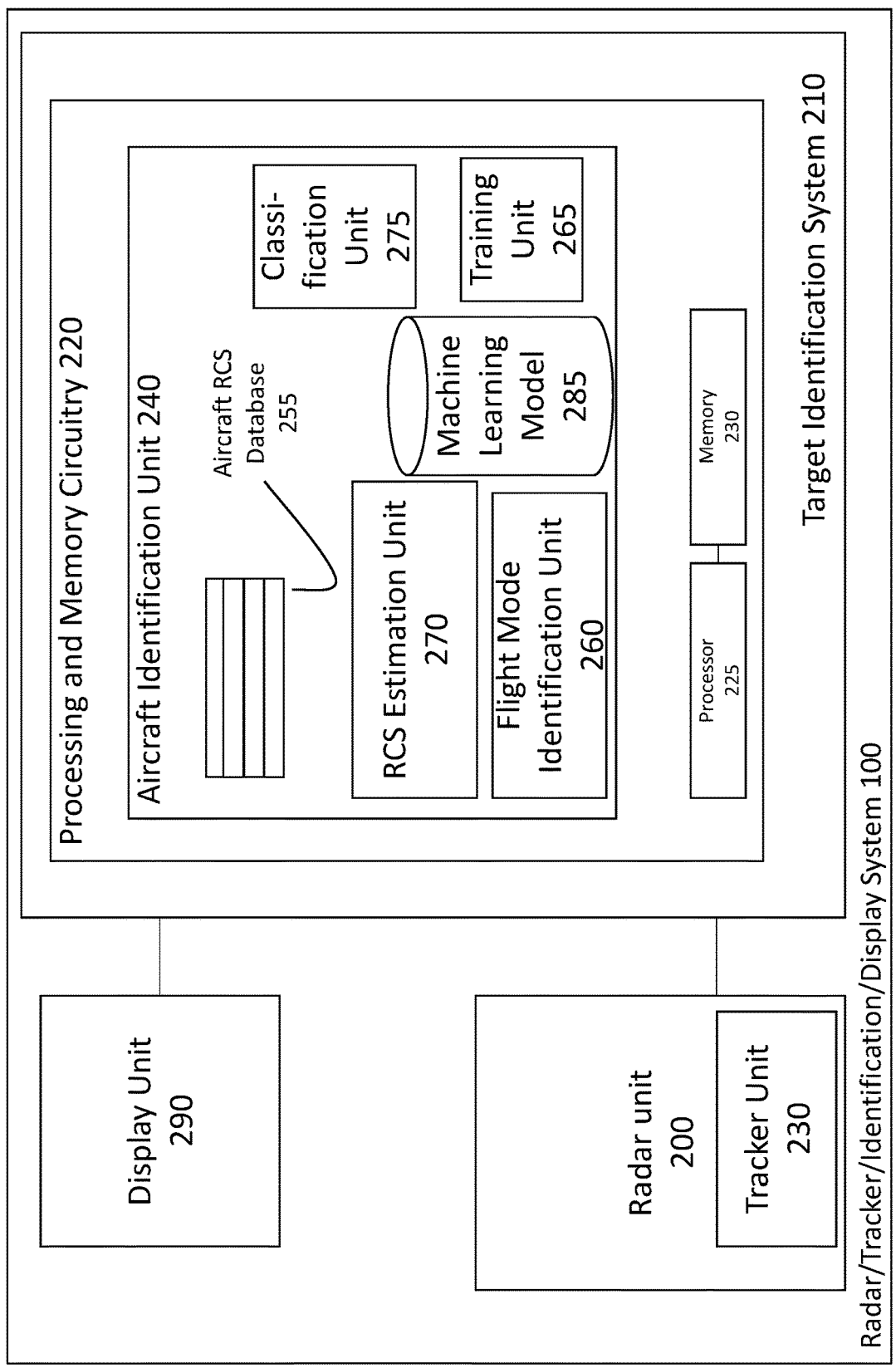
FIG. 2a illustrates a block diagram of an example target identification system configured to provide identification of a target aircraft via machine-learning-based classification of radar data, according to some embodiments of the presently disclosed subject matter.

Attention is now drawn to FIG. 2a, which illustrates a system diagram of an example target identification system configured to provide identification of a target aircraft via machine-learning-based classification of radar data, according to some embodiments of the presently disclosed subject matter.

FIG. 2a is similar to FIG. 2 and includes many of the same components and units, and the descriptions above of these components can apply in some embodiments. FIG. 2a also differs from FIG. 2 in several respects, as detailed below.

Processing and Memory Circuitry 220 can include a machine learning model 285. Machine learning model 285 can be any kind of suitable machine learning model, such as, for example,—a neural network, support vector machines etc. In some embodiments, machine learning model 285 is a neural network with one input layer, one output layer, and at least one hidden layer.

In some embodiments, the neural network has a softmax output layer that normalizes the outputs into probabilities.

In some embodiments, machine learning model 285 can be trained with a training dataset that includes features derived from an RCS Time series (for example: an estimated RCS time series based on a series of radar plots with specific aspect angles) as well as a classification label (for example: an aircraft type).

In some embodiments, machine learning model 285 is configured to receive runtime input consisting of a series of target RCS measurements (or data indicative of a series of target RCS measurements), and to generate output describing an aircraft type (or providing data indicative of an aircraft type) learned to be associated with the input, in accordance with the training of machine learning model 285.

In some embodiments, machine learning model 285, after training, can be used to classify features derived from, for example, a RCS time series derived from radar monitoring (including real-time monitoring) of an airborne object, and determine a classification label indicating an identification of the airborne object with an aircraft type.

Processing and Memory Circuitry 220 can include training unit 265. Training unit 265 can receive RCS estimation data from the RCS estimation unit 270 and prepare training data for the machine learning model 285. An example process for preparing training data is described below with reference to FIG. 8.

Processing and Memory Circuitry 220 can include classification unit 275. Classification unit 275 can utilize machine learning model 285 to classify radar plot data (for example: received from radar unit 220), resulting in an identification of an aircraft. An example process for identifying an aircraft using the machine learning model 285 is described hereinbelow, with reference to FIG. 7.

In some embodiments, RCS correlation unit 280 is not present.

It is noted that the teachings of the presently disclosed subject matter are not bound by the Radar/Tracker/Identification/Display system and associated components described with reference to FIG. 2a. Equivalent and/or modified functionality can be consolidated or divided in another manner and can be implemented in any appropriate combination of software with firmware and/or hardware and executed on a suitable device.

Figure 7:
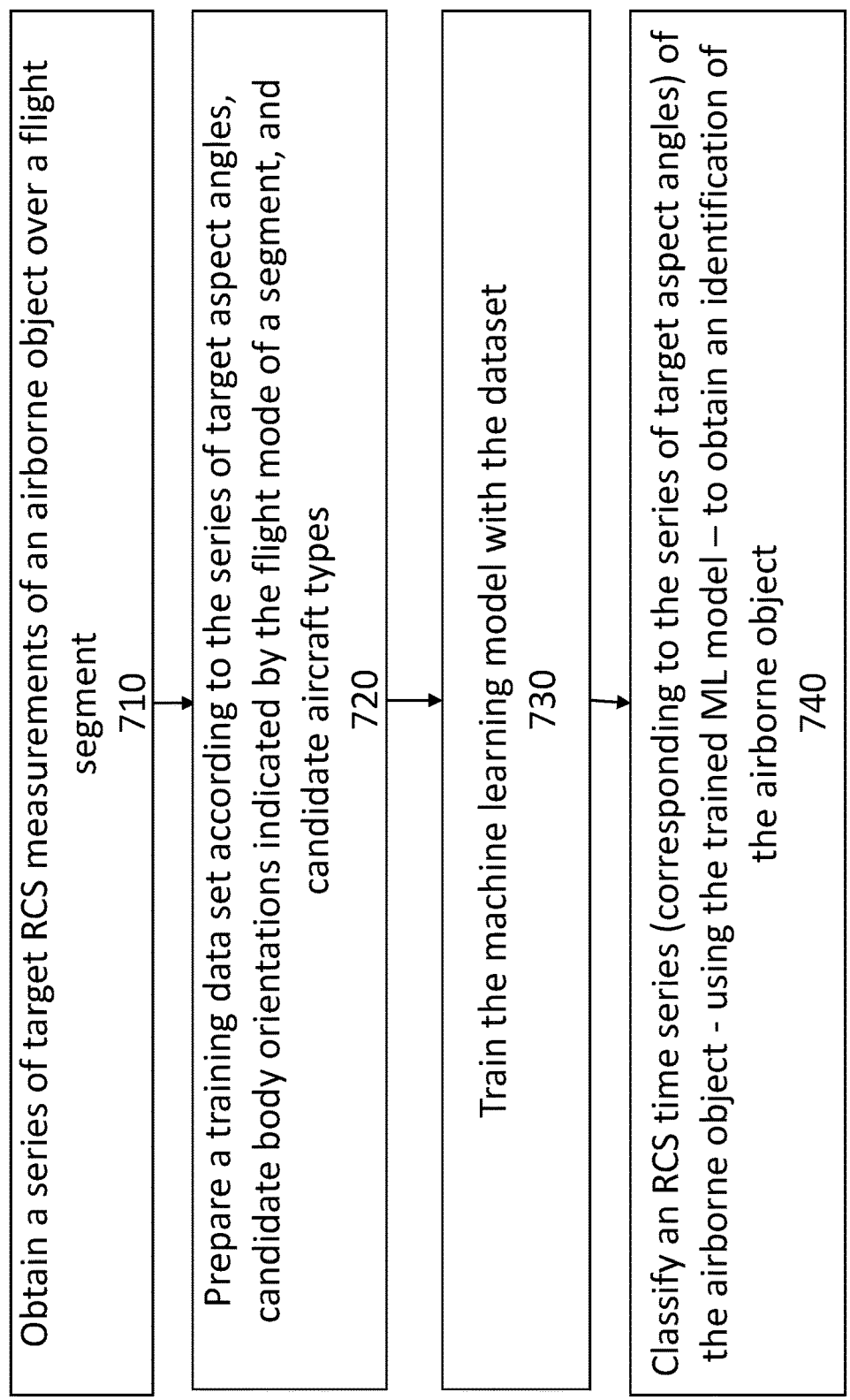
FIG. 7 illustrates a flow diagram of an example process of machine-learning-based identification of an airborne object from radar data, according to some embodiments of the presently disclosed subject matter.

Attention is now drawn to FIG. 7, which illustrates a flow diagram of an example process of machine-learning-based identification of an airborne object from radar data, according to some embodiments of the presently disclosed subject matter.

The target identification system 210 (for example: training unit 265) can begin the process by obtaining (710) a series of RCS measurements derived from tracking of a target airborne object. This series of RCS measurements is herein termed a "series of target RCS measurements" i.e. a series of RCS measurements from a series of radar plots of a monitored airborne object—where each RCS measurement is associated with the aspect angles between the radar and the airborne object at the time of the measurement (for example: represented as azimuth and elevation). Similarly, the series consisting of the aspect angles of the measurements is herein termed the "series of target aspect angles" of the airborne object. For example: in the tracking of the airborne object in FIG. 1, the series of target aspect angles can consist of aspect angles 120a, 120b, 120c, 120d, and 120e.

The target identification system 210 (for example: training unit 265) can obtain the series of target RCS measurements from, for example, radar unit 200. In some embodiments, the target identification system 210 (for example: training unit 265) obtains data indicative of the series of target RCS measurements from, for example, radar unit 200.

In some embodiments the series of target aspect angles used for preparing a training dataset can consist of the aspect angles from a series of radar plots that are part of a flight segment with a single flight mode. The target identification system 210 (for example: flight mode identification unit 260) can identify a flight segment with a single flight mode using methods described above, for example with reference to FIG. 4.

The target identification system 210 (for example: training unit 265) can next prepare (720) a training data set for training the machine learning model 285 to identify an airborne object according to its series of target RCS measurements. In some embodiments, the preparation of the training data set utilizes the estimated target RCS time series that were calculated. Details of an example method for preparation of a training dataset arc described below, with reference to FIG. 8.

The target identification system 210 (for example: training unit 265) can next train (730) the machine learning model 285. The training can utilize a training data set prepared according to the method described below (with reference to FIG. 8) or with a training set prepared according to a different method.

In some embodiments, the training data set consists of at least one training example, where each training example includes feature data that is derivative of an estimated candidate aircraft RCS time series, where the estimated candidate aircraft RCS time series were calculated (for example) according to a series of target aspect angles, a candidate aircraft type, and at least one candidate body orientation—as described below with reference to FIG. 8. In some embodiments, the feature data of a training example includes data derived from the candidate aircraft RCS time series as detailed below with reference to FIG. 8.

The target identification system 210 (for example: training unit 265) can use any suitable training technique. In some embodiments, the training dataset can be divided into training examples and validation examples, and hackpropagation can be used to ensure that the training has been effective.

After the machine learning model has been trained, the target identification system 210 (for example: classification unit 275) can provide data indicative of the series of the series of target RCS measurements as input to the trained machine learning model 285. The machine learning model 285 then can output data indicative of identification of the airborne object with an aircraft type.

In some embodiments, the target identification system 210 (for example: classification unit 275) can do this by utilizing machine learning model 285 to classify (740) the series of target RCS measurements from the tracking of the airborne object. The result of this classification can be an identification of the airborne object with a candidate aircraft type. In some embodiments, machine learning model 285 can output data indicative of identification of the airborne object with an aircraft type in a different suitable type of data format.

In some embodiments (described above with reference to FIG. 2a), the classification can result in a probability value associated with each candidate aircraft type maintained in aircraft RCS database 255. In such an embodiment, the candidate aircraft classified as the highest probability can be identified with the airborne object, for example: if its probability is above some threshold e.g. 0.8.

It is noted that if data for several flight segments (e.g. with separate inferred flight modes) are available, target identification system 210 (for example: classification unit 275) can, for example, perform the method described in FIG. 7 separately for each flight segment. Target identification system 210 (for example: classification unit 275) can then make a final classification by calculating weighted probabilities over the multiple flight segments.

By way of non-limiting example: if a first flight segment returns probability 0.95 for aircraft A, and a second flight segment returns probability 0.6 for aircraft A, then target identification system 210 (for example: classification unit 275) can, for example, weight the first flight segment at 0.75 and the second flight segment at 0.25 (for example because the flight segment has significantly more radar plots than the second), resulting in an assessed weight of (0.75*0.95)+(0.25*0.6)=0.8625

It is noted that in some embodiments, the steps of the method illustrated in FIG. 7 can be executed in a realtime manner. In this context, the term realtime can mean that the steps are executed upon monitoring of an airborne object, and in a manner that facilitates a tactical response. By way of non-limiting example, in some embodiments a radar unit 200 can track an airborne object and transfer data indicative of RCS measurement to target identification system 210, which then conducts machine learning for the series of the target aspect angles and then classifies the series of target RCS measurements within e.g. 1-2 seconds or some other time interval short enough to facilitate a tactical response.

It is noted that the teachings of the presently disclosed subject matter are not bound by the flow chart illustrated in FIG. 7, and that the illustrated operations can occur out of the illustrated order. For example, operations 720 and 730, shown in succession, can be executed substantially concurrently, or partially in the reverse order. It is also noted that whilst the flow chart is described with reference to elements of the system of FIG. 1 or 2a, this is by no means binding, and the operations can be performed by elements other than those described herein.

Figure 8:
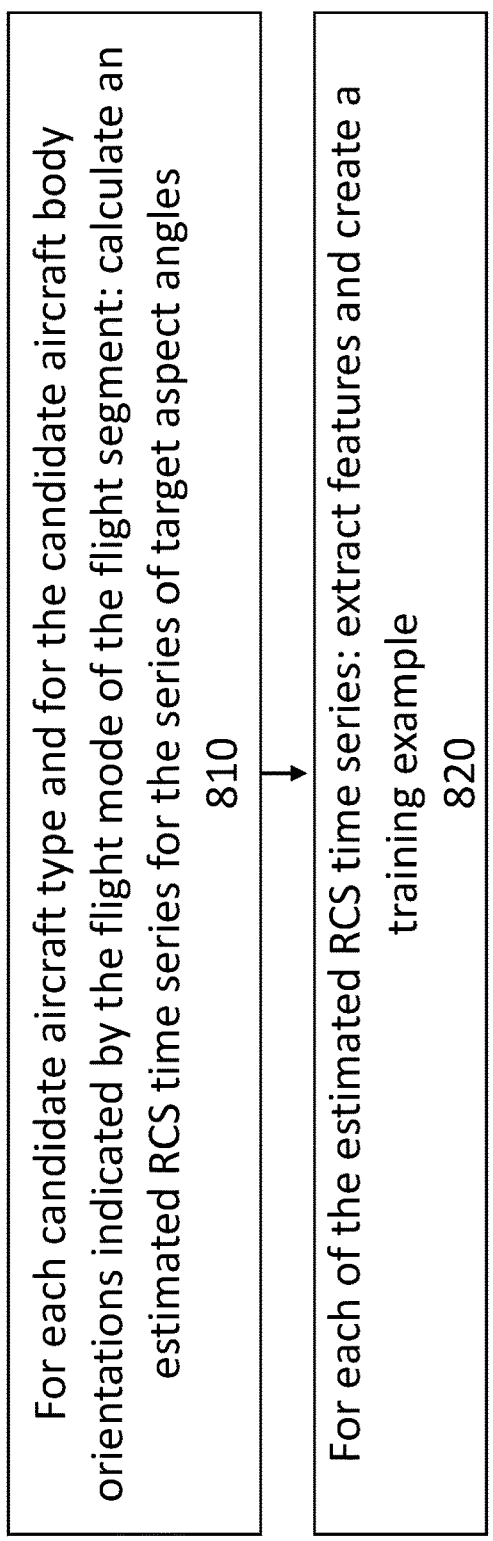
FIG. 8 illustrates a flow chart of an example method of creating a training data set to be used in training a machine learning model, according to some embodiments of the presently disclosed subject matter.

Attention is now drawn to FIG. 8, which illustrates a flow chart of an example method of creating a training data set to be used in training a machine learning model, so as to enable identifying an airborne object based on its series of target RCS measurements, according to some embodiments of the presently disclosed subject matter.

The target identification system 210 (for example: RCS estimation unit 270) can begin by calculating estimated RCS time series from which features can be extracted.

In some embodiments, target identification system 210 (for example: RCS estimation unit 270) can calculate (810) estimated RCS time series for each candidate aircraft type for which data is stored in Aircraft RCS database 255, and for each candidate body orientation indicated for the flight mode that was inferred for the flight segment. Calculations of estimated RCS time series can utilize the series of target aspect angles, and are described above—with reference to FIG. 4. The series of target aspect angles can be calculated from the series of target RCS measurements as described above with reference to FIG. 7.

In some embodiments, target identification system 210 (for example: RCS estimation unit 270) calculates an estimated RCS time series for at least one candidate aircraft type, and for at least one candidate body orientation.

The target identification system 210 (for example: training unit 265) can next extract (820)—from each estimated RCS time series—features that will constitute an example for training machine learning model 285. In some embodiments, target identification system 210 (for example: training unit 265) extracts features from at least one estimated RCS time series.

The features can be any relevant data from the estimated RCS time series.

In some embodiments, the target identification system 210 (for example: training unit 275) uses EMD to decompose the RCS time series into IMFs. EMD can enable dividing the RCS time series into a low-frequency component and a high-frequency component. The low frequencies can correspond to the observation angle and measurement errors, while the higher frequencies can be related to the geometry and body angles of the airborne object. Therefore, rapidly varying components in the RCS time-series can be used to characterize the airborne object. These rapidly varying components can be extracted from the first IMFs.

Given an RCS time-series x[n] and corresponding IMFs $u_i[n]$ for n=0, ..., N−1 and i=0, ..., L−1 where N is the number of samples and L is the number of IMF components, the following features can be extracted:

TABLE 1

| RCS Features | $i^{th}$ IMF Features |
|---|---|
| $\max_{0 \le n \le N-1} x[n]$ | $\max_{0 \le n \le N-1} u_i[n]$ |
| $\min_{0 \le n \le N-1} x[n]$ | $\min_{0 \le n \le N-1} u_i[n]$ |
| mean (x[n]) = $\mu_x$ | # of zero crossings |
| variance (x[n]) = $\sigma_x^2$ | variance $(u_i[n]) = \sigma_{u_i}^2$ |
| skewness = $E\left[\left(\frac{x[n]-\mu_x}{\sigma_x}\right)^3\right]$ | skewness = $E\left[\left(\frac{u_i[n]-\mu_{u_i}}{\sigma_{u_i}}\right)^3\right]$ |
| kurtosis = $E\left[\left(\frac{x[n]-\mu_x}{\sigma_x}\right)^4\right]$ | kurtosis = $E\left[\left(\frac{u_i[n]-\mu_{u_i}}{\sigma_{u_i}}\right)^4\right]$ |
| energy = $\Sigma_{n=0}^{N-1} x^2[n]$ | energy = $\Sigma_{n=0}^{N-1} u_i^2[n]$ |
| Hjorth mobility = $\frac{\sigma_{\dot{x}}}{\sigma_x}$ | Hjorth mobility = $\frac{\sigma_{\dot{u}_i}}{\sigma_{u_i}}$ |
| Hjorth complexity = $\frac{\sigma_{\ddot{x}}\sigma_x}{\sigma_{\dot{x}}^2}$ | Hjorth complexity = $\frac{\sigma_{\ddot{u}_i}\sigma_{u_i}}{\sigma_{\dot{u}_i}^2}$ |

The first and second features, minimum and maximum values, can be used as a measure of the range of values the time-series can take. The next four features, i.e. the mean, variance, skewness and kurtosis of the time-series, are the $1^{st}$-$4^{th}$ central statistical moments, where the sample mean is the average of the time-series values, variance indicates the spread of data from the mean, skewness is a measure of the asymmetry of the data around the mean, and kurtosis is a measure of how outlier-prone the distribution of values is. The next feature is the energy of the signal, which is the squared $L^2$ norm. Hjorth mobility represents the mean frequency, or the portion of standard deviation of the power spectrum. Hjorth complexity represents the change in frequency of a signal.

Since the mean value of each IMF is near-zero, the number of zero crossings of each IMF can be used instead. This feature can represent the oscillatory nature of the signal.

These features can characterize the statistical and spectral nature of the time sequences well, while at the same time enabling separation of targets.

In some embodiments, all the features described in table 1 are included in each training example. In some embodiments a subset of the features are included in each training example. In some embodiments, at least one RCS feature (i.e. from the RCS column) is included, and at least one EMD feature (i.e. from the EMD column) is included.

In some embodiments, a training example further includes data indicative (for example: a label) of a candidate aircraft type according to which the estimated RCS time series was calculated.

To test the classification method, a database of RCS signatures of 8 different targets was generated, and simulative radar and tracker data was utilized. Simulative trajectories were generated, which are made up of single flight modes: Level, Turn, Climb, and Descent, as well as trajectories containing a combination of several flight modes. Overall, 120 trajectories of single flight-modes were generated, including 30 of each type, as well as 80 trajectories containing a combination of flight-modes. It is noted that the mixed flight-mode trajectories are the more realistic scenarios. The information in the simulated radar and tracker included: target position throughout the trajectory, target velocity, and radar position, as well as SNR values along the trajectory, which are transformed into RCS values, as explained above.

A realistic additive white Gaussian noise of up to ±0.5° was added to all three yaw, pitch and roll angles of the observed aircraft throughout its trajectory. This noise represents real-noise obtained by the radar system measurements. For each simulated trajectory, a corresponding RCS time-series x was generated using the database.
Performance results were gathered according to the different trajectory types (level, turns, climbs, descents, and a combination of these).

The final results are given below. In the right column the classification accuracy is given, defined as the number of successfully classified trajectories relative to the total number of tested trajectories. The corresponding amount of additive white Gaussian noise on the body-angles, is given in the left column.

| Body-Angle Noise | Classification Accuracy |
| --- | --- |
| No Noise | 93.3% |
| ± 0.1° | 87.5% |
| ± 0.3° | 82.7% |
| ± 0.5° | 80.1% |

As the results table demonstrates, the classification process is very successful in the absence of noise. (Note that even "noiseless" simulations are corrupted with inherent noise due to the resolution of the RCS database).
Classification can either be correct, incorrect, or unknown. Targets are defined to be unknown when there is not a good match in the database, or due to a lack of data for a proper classification procedure. This typically happens when the number of measurements is too small, or when the RCS time-series cannot be decomposed into IMFs. The latter may be the case when the signal is not sufficiently oscillatory. Even for very large noise of up to ±0.5°, the neural network-based method's accuracy is over 80%.

It is noted that the teachings of the presently disclosed subject matter are not bound by the flow chart illustrated in FIG. 8, and that the illustrated operations can occur out of the illustrated order. For example, operations 810 and 820, shown in succession, can be executed substantially concurrently, or partially in the reverse order. It is also noted that whilst the flow chart is described with reference to elements of the system of FIG. 1 or 2a, this is by no means binding, and the operations can be performed by elements other than those described herein.

Figure 9:
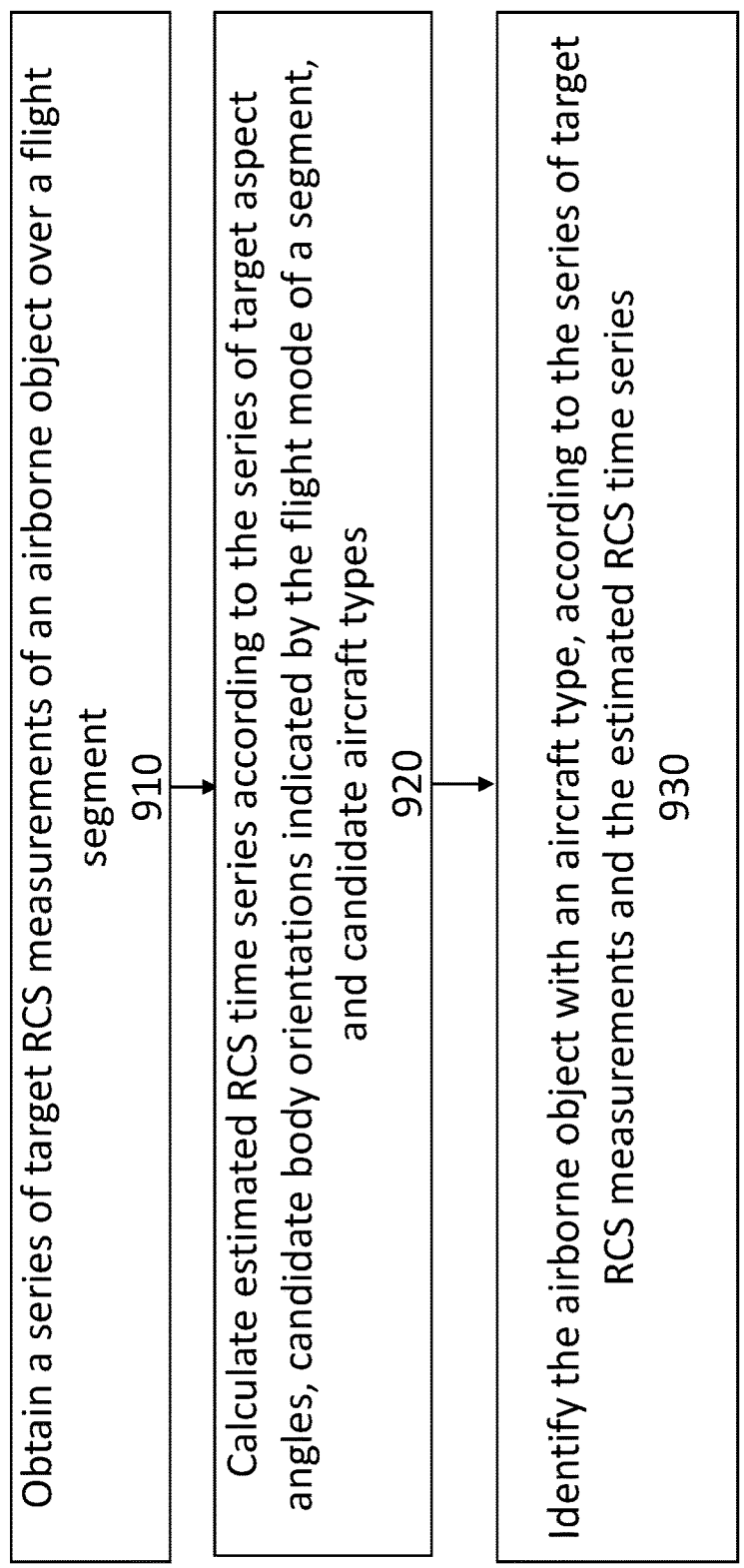
FIG. 9 illustrates a flow diagram of an example process of identification of an airborne object from a series of target RCS measurements, according to some embodiments of the presently disclosed subject matter.

Attention is now drawn to FIG. 9, which illustrates a flow diagram of an example process of identification of an airborne object from a series of target RCS measurements, according to some embodiments of the presently disclosed subject matter.

The target identification system 210 (for example: RCS estimation unit 270) can begin the process by obtaining (910) a series of target RCS measurements of an airborne object (or data indicative of a series of target RCS measurements of an airborne object). The aspect angles of the airborne object relative to a measuring radar at the time of measurement (or data indicative of these aspect angles) is herein termed as being associated with the RCS measurement (and the RCS measurement is similarly described as being associated with the aspect angles). Obtaining a series of RCS measurements and related data is described above—for example with reference to FIGS. 1, 1a, and 4-.

The target identification system 210 (for example: RCS estimation unit 270) can next calculate (920) one or more estimations of candidate aircraft RCS time series. Each estimation of a candidate aircraft RCS time series can be calculated in accordance with, at least, the series of target aspect angles, a candidate aircraft type, and at least one candidate body orientation, as described above with reference to FIG. 4. In some embodiments, estimated target RCS time series are calculated for all candidate aircraft types for which data is maintained in aircraft RCS database 255, and for a number of candidate body angles as indicated by a flight mode that was inferred from the series of target aspect angles. In some embodiments, at least one estimated target RCS time series is calculated.

The target identification system 210 (for example: aircraft identification unit 240) can next determine data indicative of identification of (930) the airborne object with an aircraft type, in accordance with, at least, the calculated estimations of candidate aircraft RCS time series and the series of target RCS measurements.

In some embodiments, target identification system 210 (for example: training unit 240) determines data indicative of identification by creating a training dataset for a machine learning model, training a machine learning model, and classifying the series of target RCS measurements using the trained machine learning model, as described in detail (by way of non-limiting example) with reference to FIGS. 7-8.

In some embodiments, target identification system 210 (for example: RCS correlation unit 280) determines data indicative of identification by calculating degrees of matching between (for example) each of the estimated target RCS time series and the series of target RCS measurements. Target identification system 210 (for example: RCS correlation unit 280) can then determine which estimated target RCS time series has the highest degree of matching, and then (for example) identify the candidate aircraft type for which the estimated target RCS time series was generated as the aircraft type of the airborne object. Details on example methods of calculating degrees of matching and identifying aircraft according to degrees of matching appear above, for example, with reference to FIG. 6.

It is noted that the teachings of the presently disclosed subject matter are not bound by the flow chart illustrated in FIG. 9, and that the illustrated operations can occur out of the illustrated order. For example, operations 920 and 930, shown in succession, can be executed substantially concurrently, or partially in the reverse order. It is also noted that whilst the flow chart is described with reference to elements of the system of FIG. 1, 2 or 2a, this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A processor-based method of identifying an airborne object, the processor-based method comprising:
   a) obtaining data indicative of a series of target Radar Cross Section (RCS) measurements of an airborne object, wherein each target RCS measurement is associated with data indicative of aspect angles of the airborne object relative to a measuring radar at a respective time of measurement, thereby giving rise to a series of target aspect angles of the airborne object;
   b) calculating at least one estimation of a candidate aircraft RCS time series, each estimation of a candidate aircraft RCS time series being calculated in accordance with, at least, the series of target aspect angles, a respective candidate aircraft type, and at least one candidate aircraft body orientation; and
   c) determining data indicative of identification of the airborne object with an aircraft type, in accordance with, at least, the at least one estimation of a candidate aircraft RCS time series, and the series of target RCS measurements.

2. The processor-based method of claim 1, wherein:
   a flight mode was inferred in accordance with the series of target aspect angles of the airborne object; and
   at least one candidate airborne object body orientation was selected in accordance with the inferred flight mode.

3. The processor-based method of claim 2, wherein the flight mode was inferred by a method comprising:
   selecting the flight mode from a group that includes at least one of: level flight, ascending flight, descending flight, and banked turn.

4. The processor-based method of claim 1, wherein calculating at least one RCS value of an estimation of a candidate aircraft RCS time series comprises:
   calculating a radar-beam direction in an aircraft body frame, in accordance with, at least, aspect angles associated with a respective target RCS measurement, and a candidate airborne object body orientation of the at least one candidate airborne object body orientation; and
   estimating an RCS value in accordance with the calculated radar-beam direction and the respective candidate aircraft type.

5. The processor-based method of claim 4, wherein the estimating an RCS value in accordance with the calculated radar-beam direction and the respective candidate aircraft type comprises:
   retrieving data indicative of an RCS value, according to, at least, the calculated radar-beam direction and the respective candidate aircraft type, from an RCS database.

6. The processor-based method of claim 1, wherein the determining data indicative of identification of the airborne object with an aircraft type comprises:
   for each estimation of a candidate aircraft RCS time series, calculating a degree of matching between the estimation and the series of target RCS measurements, thereby giving rise to data indicative of identification of the airborne object with the respective candidate aircraft type.

7. The processor-based method of claim 6, further comprising:
   identifying the candidate aircraft type for which a calculated estimation of a RCS time series gave rise to a best calculated degree of matching, thereby giving rise to a best match aircraft type.

8. The processor-based method of claim 6, wherein the calculating a degree of matching between the estimation and the series of target RCS measurements comprises:
   a) applying empirical mode decomposition to the series of target RCS measurements, thereby giving rise to a first group of intrinsic mode functions (IMFs);
   b) applying empirical mode decomposition to the estimation, thereby giving rise to a second group of IMFs;
   c) selecting, from the first group of IMFs, an IMF with a highest rate of fluctuations, giving rise to a first selected IMF;
   d) selecting, from the second group of IMFs, an IMF with a same frequency as the first selected IMF, giving rise to a second selected IMF; and
   e) calculating a linear correlation between the first selected IMF and the second selected IMF, resulting in a first correlation value;
   thereby giving rise to a degree of matching, based on a single IMF frequency, between the estimation and the series of target RCS measurements.

9. The processor-based method of claim 8, wherein the calculated linear correlation is a Pearson correlation coefficient.

10. The processor-based method of claim 8, wherein the calculated linear correlation is a matched filter.

11. The processor-based method of claim 8, additionally comprising:
   f) selecting, from the first group of IMFs, an IMF with a second-highest rate of fluctuations, giving rise to a third IMF;
   g) selecting, from the second group of IMFs, an IMF with a same frequency as the third selected IMF, giving rise to a fourth selected IMF; and
   h) calculating a linear correlation between the third IMF and the fourth IMF, resulting in a second correlation value; and
   i) calculating a degree of matching in accordance with the first correlation value and the second correlation value;

thereby giving rise to a degree of matching, based on two IMF frequencies, between the estimation and the series of target RCS measurements.

12. The processor-based method of claim 1, wherein the determining data indicative of identification of the airborne object with an aircraft type comprises:
 a) training a machine learning model in accordance with a training dataset comprising at least one training example,
  wherein each training example comprises:
   i. feature data derivative of an estimation of an candidate aircraft RCS time series of the at least one estimation of a candidate aircraft RCS time series, and
   ii. data indicative of the candidate aircraft type in accordance with which the estimation of a candidate aircraft RCS time series was calculated, and
  wherein the machine learning model is configured to receive runtime input comprising data indicative of a series of target RCS measurements, and to generate output comprising data indicative of an aircraft type learned to be associated with the input, in accordance with the training of the machine learning model; and
 b) providing data indicative of the series of target RCS measurements as input to the trained machine learning model, resulting in output of data indicative of an aircraft type, thereby giving rise to data indicative of identification of the airborne object with an aircraft type.

13. The processor-based method of claim 12, wherein a)-b) are executed in realtime.

14. The processor-based method of claim 12, wherein the machine learning model comprises a neural network comprising an input layer, an output layer, and at least one hidden layer.

15. The processor-based method of claim 12, wherein the data derivative of an estimation of a candidate aircraft RCS time series comprises:
 a) at least one of: maximum RCS value, minimum RCS value, mean RCS value, RCS time series variance, RCS time series skewness, RCS time series kurtosis, RCS time series energy, RCS time series Hjorth mobility, and RCS time series Hjorth complexity; and
 b) data derivative of one or more Intrinsic Mode Functions (IMFs), the IMFs being derived according to empirical mode decomposition (EMD) of the estimation.

16. The processor-based method of claim 15, wherein the data derivative of each IMF of the one or more IMFs comprises at least one of: maximum IMF value, minimum IMF value, number of zero crossings, IMF variance, IMF skewness, IMF kurtosis, IMF energy, IMF Hjorth mobility, and IMF Hjorth complexity.

17. The method of claim 1, wherein at least one RCS estimation of the RCS time series is calculated in accordance with a candidate aircraft body orientation that is determined by a method not requiring:
 a velocity of the airborne object at the respective time of measurement.

18. The method of claim 1, wherein at least one RCS estimation of the RCS time series is calculated in accordance with a candidate aircraft body orientation that is determined by a method not requiring:
 a trajectory of the airborne object at the respective time of measurement.

19. A target identification system comprising a processing and memory circuitry, and configured to operate in conjunction with a radar unit and to perform a method of identification of an airborne object according to radar target measurement data, the method comprising:
 a) obtaining data indicative of a series of target Radar Cross Section (RCS) measurements of an airborne object, wherein each target RCS measurement is associated with data indicative of aspect angles of the airborne object relative to a measuring radar at a respective time of measurement, thereby giving rise to a series of target aspect angles of the airborne object;
 b) calculating at least one estimation of a candidate aircraft RCS time series, each estimation of a candidate aircraft RCS time series being calculated in accordance with, at least, the series of target aspect angles, a respective candidate aircraft type, and at least one candidate aircraft body orientation; and
 c) determining data indicative of identification of the airborne object with an aircraft type, in accordance with, at least, the at least one estimation of a candidate aircraft RCS time series, and the series of target RCS measurements.

20. A non-transitory computer readable medium comprising instructions that, when executed by a computer, cause the computer to perform a method of identifying an airborne object, the method comprising:
 1. Obtaining data indicative of a series of target Radar Cross Section (RCS) measurements of an airborne object, wherein each target RCS measurement is associated with data indicative of aspect angles of the airborne object relative to a measuring radar at a respective time of measurement, thereby giving rise to a series of target aspect angles of the airborne object;
 2. Calculating at least one estimation of a candidate aircraft RCS time series, each estimation of a candidate aircraft RCS time series being calculated in accordance with, at least, the series of target aspect angles, a respective candidate aircraft type, and at least one candidate aircraft body orientation; and
 3. determining data indicative of identification of the airborne object with an aircraft type, in accordance with, at least, the at least one estimation of a candidate aircraft RCS time series, and the series of target RCS measurements.

* * * * *